(12) United States Patent
George et al.

(10) Patent No.: US 7,983,998 B2
(45) Date of Patent: Jul. 19, 2011

(54) FEEDBACK IN GROUP BASED HIERARCHICAL TEMPORAL MEMORY SYSTEM

(75) Inventors: Dileep George, Menlo Park, CA (US); Robert G. Jaros, San Francisco, CA (US)

(73) Assignee: Numenta, Inc., Redwood City, CA (US)

( * ) Notice: Subject to any disclaimer, the term of this patent is extended or adjusted under 35 U.S.C. 154(b) by 629 days.

(21) Appl. No.: 12/053,204

(22) Filed: Mar. 21, 2008

(65) Prior Publication Data

US 2009/0240639 A1    Sep. 24, 2009

(51) Int. Cl.
*G06F 15/18* (2006.01)
(52) U.S. Cl. .......................................... 706/12
(58) Field of Classification Search ...................... 706/12
See application file for complete search history.

(56) References Cited

U.S. PATENT DOCUMENTS

| | | | |
|---|---|---|---|
| 4,766,534 A | 8/1988 | DeBenedictis | |
| 4,845,744 A | 7/1989 | DeBenedictis | |
| 5,255,348 A | 10/1993 | Nenov | |
| 5,712,953 A | 1/1998 | Langs | |
| 6,122,014 A | 9/2000 | Panusopone et al. | |
| 6,195,622 B1 | 2/2001 | Altschuler et al. | |
| 6,400,996 B1 | 6/2002 | Hoffberg et al. | |
| 6,468,069 B2 | 10/2002 | Lemelson et al. | |
| 6,567,814 B1 | 5/2003 | Bankier et al. | |
| 6,625,585 B1 | 9/2003 | MacCuish et al. | |
| 6,714,941 B1 | 3/2004 | Lerman et al. | |
| 6,751,343 B1 | 6/2004 | Ferrell et al. | |
| 6,957,241 B2 * | 10/2005 | George ........................ | 708/400 |

(Continued)

FOREIGN PATENT DOCUMENTS

EP            1557990 A      7/2005
(Continued)

OTHER PUBLICATIONS

Unsupervised Hebbian learning by recurrent multilayer neural networks for temporal hierarchical pattern recognition, Lo, J.T.-H.; Information Sciences and Systems (CISS), 2010 44th Annual Conference on Digital Object Identifier: 10.1109/CISS.2010.5464925 Publication Year: 2010 , pp. 1-6.*

(Continued)

*Primary Examiner* — Michael Holmes
(74) *Attorney, Agent, or Firm* — Fenwick & West LLP

(57) ABSTRACT

A Hierarchical Temporal Memory (HTM) network has at least first nodes and a second node at a higher level than the first nodes. The second node provides an inter-node feedback signal to the first nodes for grouping patterns and sequences (or co-occurrences) in input data received at the first nodes at the first nodes. The second node collects forward signals from the first nodes; and thus, the second node has information about the grouping of the patterns and sequences (or co-occurrences) at the first nodes. The second node provides inter-node feedback signals to the first nodes based on which the first nodes may perform the grouping of the patterns and sequences (or co-occurrences) at the first nodes. Also, a node in a Hierarchical Temporal Memory (HTM) network comprising a co-occurrence detector and a group learner coupled to the co-occurrence detector. The group learner provides an intra-node feedback signal to the co-occurrence detector including information on the grouping of the co-occurrences. The co-occurrence detector may select co-occurrences to be split, merged, retained or discarded based on the intra-node feedback signals.

18 Claims, 21 Drawing Sheets

U.S. PATENT DOCUMENTS

| | | | |
|---|---|---|---|
| 7,088,693 B2* | 8/2006 | George | 370/329 |
| 7,251,637 B1 | 7/2007 | Caid et al. | |
| 7,613,675 B2* | 11/2009 | Hawkins et al. | 706/55 |
| 7,620,608 B2* | 11/2009 | Jaros et al. | 706/12 |
| 7,624,085 B2* | 11/2009 | Hawkins et al. | 706/52 |
| 7,739,208 B2* | 6/2010 | George et al. | 706/16 |
| 7,826,990 B2* | 11/2010 | Nasle et al. | 702/85 |
| 7,840,395 B2* | 11/2010 | Nasle et al. | 703/18 |
| 7,840,396 B2* | 11/2010 | Radibratovic et al. | 703/18 |
| 7,844,439 B2* | 11/2010 | Nasle et al. | 703/18 |
| 7,844,440 B2* | 11/2010 | Nasle et al. | 703/18 |
| 2002/0150044 A1 | 10/2002 | Wu et al. | |
| 2003/0069002 A1 | 4/2003 | Hunter et al. | |
| 2003/0123732 A1 | 7/2003 | Miyazaki et al. | |
| 2003/0167111 A1 | 9/2003 | Kipersztok et al. | |
| 2004/0002838 A1 | 1/2004 | Oliver et al. | |
| 2004/0148520 A1 | 7/2004 | Talpade et al. | |
| 2004/0267395 A1 | 12/2004 | Discenzo et al. | |
| 2005/0063565 A1 | 3/2005 | Nagaoka et al. | |
| 2005/0190990 A1 | 9/2005 | Burt et al. | |
| 2005/0222811 A1 | 10/2005 | Jakobson et al. | |
| 2006/0184462 A1 | 8/2006 | Hawkins | |
| 2006/0212444 A1 | 9/2006 | Handman et al. | |
| 2006/0235320 A1 | 10/2006 | Tan et al. | |
| 2006/0248026 A1 | 11/2006 | Aoyama et al. | |
| 2006/0248073 A1 | 11/2006 | Jones et al. | |
| 2006/0253491 A1 | 11/2006 | Gokturk et al. | |
| 2006/0259163 A1 | 11/2006 | Hsiung et al. | |
| 2007/0005531 A1 | 1/2007 | George et al. | |
| 2007/0192264 A1 | 8/2007 | Hawkins et al. | |
| 2007/0192267 A1 | 8/2007 | Hawkins et al. | |
| 2007/0192268 A1 | 8/2007 | Hawkins et al. | |
| 2007/0192269 A1 | 8/2007 | Saphir et al. | |
| 2007/0192270 A1 | 8/2007 | Hawkins et al. | |
| 2007/0228703 A1 | 10/2007 | Breed | |
| 2007/0276774 A1 | 11/2007 | Ahmad et al. | |
| 2008/0059389 A1 | 3/2008 | Jaros et al. | |
| 2009/0006289 A1 | 1/2009 | Jaros et al. | |
| 2010/0207754 A1 | 8/2010 | Shostak et al. | |

FOREIGN PATENT DOCUMENTS

| | | | |
|---|---|---|---|
| WO | WO 2006/063291 A | | 6/2006 |
| WO | WO 2008/067326 A2 | | 6/2008 |
| WO | WO 2009/006231 A | | 1/2009 |

OTHER PUBLICATIONS

Online temporal pattern learning, Farahmand, N.; Dezfoulian, M.H.; GhiasiRad, H.; Mokhtari, A.; Nouri, A.; Neural Networks, 2009. IJCNN 2009. International Joint Conference on Digital Object Identifier: 10.1109/IJCNN.2009.5178844 Publication Year: 2009, pp. 797-802.*

Spatio—Temporal Memories for Machine Learning: A Long-Term Memory Organization, Starzyk, J.A.; He, H.; Neural Networks, IEEE Transactions on vol. 20, Issue: 5 Digital Object Identifier: 10.1109/TNN.2009.2012854 Publication Year: 2009, pp. 768-780.*

A neural network model of spatio-temporal pattern recognition, recall, and timing, Mannes, C.; Neural Networks, 1992. IJCNN., International Joint Conference on vol. 4 Digital Object Identifier: 10.1109/IJCNN.1992.227281 Publication Year: 1992, pp. 109-114 vol. 4.*

European Patent Office Communication, European Patent Application No. 07750385.2, Dec. 6, 2010, eight pages.

European Patent Office Examination Report, European Patent Application No. 08796030.8, Dec. 6, 2010, seven pages.

Lim, K. et al., "Estimation of Occlusion and Dense Motion Fields in a Bidirectional Bayesian Framework," *IEEE Transactions on Pattern Analysis and Machine Intelligence*, May 2002, pp. 712-718, vol. 24, No. 5.

United States Office Action, U.S. Appl. No. 11/680,197, Sep. 14, 2010, seventeen pages.

Dimitrova, N. et al., "Motion Recovery for Video Content Classification," ACM Transactions on Information Systems, Oct. 1995, pp. 408-439, vol. 13, No. 4.

Dolin, R. et al., "Scalable Collection Summarization and Selection," Association for Computing Machinery, 1999, pp. 49-58.

Guerrier, P., "A Generic Architecture for On-Chip Packet-Switched Interconnections," Association for Computing Machinery, 2000, pp. 250-256.

Kim, J. et al., "Hierarchical Distributed Genetic Algorithms: A Fuzzy Logic Controller Design Application," IEEE Expert, Jun. 1996, pp. 76-84.

Mishkin, M. et al., "Hierarchical Organization of Cognitive Memory," Phil. Trans. R. Soc. B., 1997, pp. 1461-1467, London.

Park, S. et al., "Recognition of Two-person Interactions Using a Hierarchical Bayesian Network," ACM SIGMM International Workshop on Video Surveillance (IWVS) 2003, pp. 65-76, Berkeley, USA.

Poppel, E., "A Hierarchical Model of Temporal Perception," Trends in Cognitive Sciences, May 1997, pp. 56-61, vol. 1, No. 2.

Tsinarakis, G.J. et al. "Modular Petri Net Based Modeling, Analysis and Synthesis of Dedicated Production Systems," Proceedings of the 2003 IEEE International Conference on Robotics and Automation, Sep. 14-19, 2003, pp. 3559-3564, Taipei, Taiwan.

Tsinarakis, G.J. et al. "Modular Petri Net Based Modeling, Analysis, Synthesis and Performance Evaluation of Random Topology Dedicated Production Systems," Journal of Intelligent Manufacturing, 2005, vol. 16, pp. 67-92.

United States Office Action, U.S. Appl. No. 11/680,197, Mar. 23, 2010, 12 pages.

United States Office Action, U.S. Appl. No. 11/713,157, Mar. 31, 2010, 14 pages.

United States Office Action, U.S. Appl. No. 11/622,458, Apr. 1, 2010, 16 pages.

United States Office Action, U.S. Appl. No. 11/622,455, Apr. 21, 2010, 12 pages.

Wu, G. et al., "Multi-camera Spatio-temporal Fusion and Biased Sequence-data Learning for Security Surveillance," Association for Computing Machinery, 2003, pp. 528-538.

Archive of "Numenta Platform for Intelligent Computing Programmer's Guide," Numenta, Mar. 7, 2007, pp. 1-186, www.numenta.com, [Online] Archived by http://archive.org on Mar. 19, 2007; Retrieved on Aug. 13, 2008 Retrieved from the Internet<URL:http://web.archive.org/web/20070319232606/http://www.numenta.com/for-developers/software/pdf/nupic_prog_guide.pdf>.

Csapo, A.B. et al., "Object Categorization Using VFA-Generated Nodemaps and Hierarchical Temporal Memories," IEEE International Conference on Computational Cybernetics, IEEE, Oct. 7, 2007, pp. 257-262.

Ding, C.H.Q., "Cluster Merging and Splitting in Hierarchical Clustering Algorithms," Proceedings of the 2002 IEEE International Conference on Data Mining (ICDM 2002), Dec. 9, 2002, pp. 139-146.

European Examination Report, European Application No. 05853611.1, Jun. 23, 2008, 4 pages.

European Examination Report, European Application No. 07750385.2, Apr. 21, 2009, 8 pages.

George, D. et al., "A Hierarchical Bayesian Model of Invariant Pattern Recognition in the Visual Cortex," Mar. 2005.

George, D. et al., "Invariant Pattern Recognition Using Bayesian Inference on Hierarchical Sequences," Technical Report, Oct. 2004, pp. 1-8.

Gottschalk, K. et al., "Introduction to Web Services Architecture," IBM Systems Journal, 2002, pp. 170-177, vol. 41, No. 2.

Hawkins, J. et al., "Hierarchical Temporal Memory Concepts, Theory and Terminology," Numenta, Jan. 27, 2007, pp. 1-20.

Hawkins, J. et al., "Hierarchical Temporal Memory Concepts, Theory and Terminology," Numenta, Mar. 27, 2007 [Online] [Retrieved on Oct. 7, 2008] Retrieved from the Internet<URL:http://www.numenta.com/Numenta_HTM_Concepts.pdf>.

Hawkins, J. et al., "Hierarchical Temporal Memory Concepts, Theory and Terminology," Numenta, May 10, 2006 [Online] [Retrieved on Jul. 16, 2008] Retrieved from the Internet<URL:http://www.neurosecurity.com/whitepapers/Numenta_HTM_Concepts.pdf>.

Hawkins, J., "Why Can't a Computer Be More Like a Brain?" IEEE Spectrum, Apr. 1, 2007, pp. 21-26, vol. 44, No. 4, IEEE Inc., New York, US.

International Search Report and Written Opinion, International Application No. PCT/US2007/003544, Jun. 16, 2008, 14 pages.
International Search Report and Written Opinion, International Application No. PCT/US07/85661, Jun. 13, 2008, 7 pages.
International Search Report and Written Opinion, International Application No. PCT/US08/55389, Jul. 25, 2008, 8 pages.
International Search Report and Written Opinion, International Application No. PCT/US08/55352, Aug. 1, 2008, 8 pages.
International Search Report and Written Opinion, International Application No. PCT/US2008/054631, Aug. 18, 2008, 14 pages.
International Search Report and Written Opinion, International Application No. PCT/US2008/068435, Oct. 31, 2008, 14 pages.
International Search Report and Written Opinion, International Application No. PCT/US2009/035193, Apr. 22, 2009, 14 pages.
"Numenta Node Algorithms Guide NuPIC 1.6," Numenta, Jun. 13, 2008, pp. 1-6.
"Numenta Node Algorithms Guide NuPIC 1.6," Numenta, Jul. 22, 2008, pp. 1-7.
"Zeta1 Algorithms Reference, Version 1.0," Numenta Inc., Mar. 1, 2007, pp. 1-36.
"Zeta1 Algorithms Reference, Version 1.2," Numenta Inc., Jun. 8, 2007, pp. 1-38.
"Zeta1 Algorithms Reference, Version 1.3," Numenta Inc., Aug. 22, 2007, pp. 1-41.
"Zeta1 Algorithms Reference, Version 1.5," Numenta Inc., Aug. 24, 2007, pp. 1-45.
Adelson, E. H., et al., "The Perception of Shading and Reflectance," Perception as Bayesian Inference, Knill, D.C., et al., 1996, pp. 409-423, Cambridge University Press, UK.
Agrawal, R. et al., "Mining Sequential Patterns," Proceedings of the 11$^{th}$ International Conference on Data Engineering 1995, pp. 3-14.
Becerra, J.A., et al., "Multimodule Artificial Neural Network Architectures for Autonomous Robot Control Through Behavior Modulation", Lecture Notes in Computer Science, 2003, pp. 169-176, vol. 2687.
Demeris, Yiannis et al., "From Motor Babbling to Hierarchical Learning by Imitation: A Robot Developmental Pathway," Proceedings of the Fifth International Workshop on Epigenetic Robotics: Modeling Cognitive Development in Robotic Systems, 2005, pp. 31-37.
Felleman, D.J. et al., "Distributed Hierarchical Processing in the Primate Cerebral Cortex," Cerebral Cortex, Jan./Feb. 1991, pp. 1-47, vol. 1.
Fine, S., et al., "The Hierarchical Hidden Markov Model: Analysis and Applications," Machine Learning, Jul. 1998, pp. 41-62, vol. 32.
Foldiak, P., "Learning Invariance from Transformation Sequences," Neural Computation, 1991, pp. 194-200, vol. 3, No. 2.
Fukushima, Kunihiko, "Neocognitron: A Self-Organizing Neural Network Model for a Mechanism of Pattern Recognition Unaffected by Shift in Position," Biol. Cybernetics, 1980, pp. 193-202, vol. 36.
George, D., et al., "A Hierarchical Bayesian Model of Invariant Pattern Recognition in the Visual Cortex", Proceedings of the 2005 IEEE International Joint Conference on Neural Networks, Aug. 2005, pp. 1812-1817, vol. 3.
George, D. et al, "Invariant Pattern Recognition Using Bayesian Inference on Hierarchical Sequences," Technical Report, Sep. 17, 2004, pp. 1-8, U.S.A.
Guo, C-E. et al., "Modeling Visual Patterns by Integrating Descriptive and Generative Methods," International Journal of Computer Vision, May 29, 2003, 28 pages, vol. 53, No. 1.
Guinea, D., et al., "Robot Learning to Walk: An Architectural Problem for Intelligent Controller," Proceedings of the 1993 IEEE International Symposium on Intelligent Control, 1993, pp. 493-498.
Han, K. et al., "Automated Robot Behavior Recognition Applied to Robotic Soccer," in Proceedings of the IJCAI-99 Workshop on Team Behaviors and Plan Recognition, 1999, 6 pages.
Hasegawa, Yasuhisa et al., "Learning Method for Hierarchical Behavior Controller," Proceedings of the 1999 IEEE International Conference on Robotics and Automation, May 1999, pp. 2799-2804, vol. 4.
Hawkins, J. et al., "On Intelligence," Sep. 2004, pp. 23-29, 106-174, 207-232, Times Books, Henry Holt and Company, New York, NY 10011.

Hernandez-Gardiol, Natalia, et al., "Hierarchical Memory-Based Reinforcement Learning," Proceedings of Neural Information Processing Systems, 2001, 7 pages.
Hinton, G.E. et al., "The "Wake-Sleep" Algorithm for Unsupervised Neural Networks," Science, May 26, 1995, pp. 1158-116, vol. 268.
Hoey, J., "Hierarchical Unsupervised Learning of Facial Expression Categories," Proceedings of the IEEE Workshop on Detection and Recognition of Events in Video, Jul. 8, 2001, pp. 99-106.
Hyvarinen, A. et al., "Bubbles: A Unifying Framework for Low-Level Statistical Properties of Natural Image Sequences," J. Opt. Soc. Am. A., 2003, pp. 1237-1252, vol. 20, No. 7.
International Search Report & Written Opinion, PCT/US2005/044729, May 14, 2007, 14 pages.
Isard, M. et al., "Icondensation: Unifying Low-Level and High-Level Tracking in a Stochastic Framework," Lecture Notes in Computer Science 1406, Burkhardt, H. et al., ed., 1998, pp. 893-908, Springer-Verlag, Berlin.
Lee, Tai S. et al, "Hierarchical Bayesian Inference in the Visual Cortex", Journal of the Optical Society of America, Jul. 7, 2003, pp. 1434-1448, vol. 20, No. 7, U.S.A.
Lenser, Scott et al, "A Modular Hierarchical Behavior-Based Architecture," RoboCup 2001: Robot Soccer World Cup V, 2002, pp. 79-99, Springer Berlin / Heidelberg.
Lewicki, M.S. et al., "Bayesian Unsupervised Learning of Higher Order Structure," Moser, M.C. et al., ed., Proceedings of the 1996 Conference in Advances in Neural Information Processing Systems 9, 1997, pp. 529-535.
Murphy, K. et al., "Using the Forest to See the Trees: A Graphical Model Relating Features, Objects and Scenes," Advances in Neural Processing System, 2004, vol. 16.
Murray, S.O. et al., "Shaper Perception Reduces Activity in Human Primary Visual Cortex," Proceedings of the Nat. Acad. of Sciences of the USA, Nov. 2002, pp. 15164-151169, vol. 99, No. 23.
Olshausen, B.A. et al., "A Neurobiological Model of Visual Attention and Invariant Pattern Recognition Based on Dynamic Routing Information," Jnl. of Neuroscience, Nov. 1993.
Pearl, J., "Probabilistic Reasoning in Intelligent Systems: Networks of Plausible Inference," 1988, pp. 143-223, Morgan Kaufmann Publishers, Inc.
Riesenhuber, Maximilian et al, "Hierarchical Models of Object Recognition in Cortex," Nature Neuroscience, Nov. 1999, pp. 1019-1025, vol. 2, No. 11, U.S.A.
Sinha, P. et al., "Recovering Reflectance and Illumination in a World of Painted Polyhedra," Fourth International Conference on Computer Vision, Berlin, May 11-14, 1993, pp. 156-163, IEEE Computer Society Press, Los Alamitos, CA.
Stringer, S.M. et al., "Invariant Object Recognition in the Visual System with Novel Views of 3D Objects," Neural Computation, Nov. 2002, pp. 2585-2596, vol. 14, No. 11.
Sudderth, E.B. et al., "Nonparametric Belief Propagation and Facial Appearance Estimation," AI Memo 2002-020, Dec. 2002, pp. 1-10, Artificial Intelligence Laboratory, Massachusetts Institute of Technology, Cambridge, MA.
Thomson, A.M. et al., "Interlaminar Connections in the Neocortex," Cerebral Cortex, 2003, pp. 5-14, vol. 13, No. 1.
Tsukada, M, "A Theoretical Model of the Hippocampal-Cortical Memory System Motivated by Physiological Functions in the Hippocampus", Proceedings of the 1993 International Joint Conference on Neural Networks, Oct. 25, 1993, pp. 1120-1123, vol. 2, Japan.
Van Essen, D.C. et al., "Information Processing Strategies and Pathways in the Primate Visual System," An introduction to Neural and Electronic Networks, 1995, 2$^{nd}$ ed.
Vlajic, N. et al., "Vector Quantization of Images Using Modified Adaptive Resonance Algorithm for Hierarchical Clustering", IEEE Transactions on Neural Networks, Sep. 2001, pp. 1147-1162, vol. 12, No. 5.
Wiskott, L. et al., "Slow Feature Analysis: Unsupervised Learning of Invariances," Neural Computation, 2002, pp. 715-770, vol. 14, No. 4.
Yedidia, J.S. et al., "Understanding Belief Propagation and its Generalizations," Joint Conference on Artificial Intelligence (IJCAI 2001), Seattle, WA, Aug. 4-10, 2001, 35 pages.

Zemel, R.S., "Cortical Belief Networks," Computational Models for Neuroscience, Hecht-Nielsen, R., et al., ed., 2003, pp. 267-287, Springer-Verlag, New York.

Fine, S. et al., "The Hierarchical Hidden Markov Model: Analysis and Applications," Machine Learning, 1998, pp. 41-62, vol. 32, Kluwer Academic Publishers, Boston.

Kuenzer, A. et al., "An Empirical Study of Dynamic Bayesian Networks for User Modeling," Proc. of the UM 2001 Workshop on Machine Learning, pages.

George, D. et al., "Invariant Pattern Recognition Using Bayesian Inference on Hierarchical Sequences," Technical Report, Sep. 17, 2004, pp. 1-8.

Hasegawa, Y. et al., "Learning Method for Hierarchical Behavior Controller," Proceedings of the 1999 IEEE International Conference on Robotics & Automation, May 1999, pp. 2799-2804.

Lenser, S. et al., "A Modular Hierarchical Behavior-Based Architecture," RoboCup 2001, LNAI 2377, 2002, Birk, A. et al, (Eds.), pp. 423-428, Springer-Verlag, Berlin, Heidelberg.

George, D. et al., "The HTM Learning Algorithm," [Online] [Retrieved on Jan. 1, 2009] Retrieved from the Internet<URL:http://www.numenta.com/for-developers/education/Numenta_HTM_Learning_Algos.pdf>.

PCT International Search Report and Written Opinion, PCT Application No. PCT/US2009/047250, Sep. 25, 2009, 13 pages.

U.S. Office Action, U.S. Appl. No. 11/622,456, Mar. 20, 2009, 9 pages.

U.S. Office Action, U.S. Appl. No. 11/622,456, Nov. 6, 2008, 7 pages.

U.S. Office Action, U.S. Appl. No. 11/622,456, May 7, 2008, 14 pages.

U.S. Office Action, U.S. Appl. No. 11/622,454, Mar. 30, 2009, 11 pages.

U.S. Office Action, U.S. Appl. No. 11/622,454, Jun. 3, 2008, 13 pages.

U.S. Office Action, U.S. Appl. No. 11/622,457, Apr. 21, 2009, 6 pages.

U.S. Office Action, U.S. Appl. No. 11/622,457, Nov. 20, 2008, 8 pages.

U.S. Office Action, U.S. Appl. No. 11/622,457, May 6, 2008, 14 pages.

U.S. Office Action, U.S. Appl. No. 11/622,457, Aug. 24, 2007, 10 pages.

U.S. Office Action, U.S. Appl. No. 11/147,069, Jul. 29, 2009, 43 pages.

U.S. Office Action, U.S. Appl. No. 11/147,069, Jan. 9, 2009, 38 pages.

U.S. Office Action, U.S. Appl. No. 11/147,069, May 15, 2008, 37 pages.

U.S. Office Action, U.S. Appl. No. 11/147,069, Oct. 30, 2007, 34 pages.

U.S. Office Action, U.S. Appl. No. 11/147,069, May 29, 2007, 36 pages.

U.S. Office Action, U.S. Appl. No. 11/147,069, Jan. 9, 2007, 27 pages.

Colombe, J., "A Survey of Recent Developments in Theoretical Neuroscience and Machine Vision," *Proceedings of the IEEE Applied Imagery Pattern Recognition Workshop*, 2003, nine pages.

Farahmand, N. et al., "Online Temporal Pattern Learning," *Proceedings of the International Joint Conference on Neural Networks*, Jun. 14-19, 2009, pp. 797-802, Atlanta, GA, USA.

Lo, J. "Unsupervised Hebbian Learning by Recurrent Multilayer Neural Networks for Temporal Hierarchical Pattern Recognition," *Information Sciences and Systems 44th Annual Conference on Digital Object Identifier*, 2010, pp. 1-6.

Mannes, C., "A Neural Network Model of Spatio-Temporal Pattern Recognition, Recall and Timing," Technical Report CAS/CNS-92-013, Feb. 1992, Department of Cognitive and Neural Systems, Boston University, USA, seven pages.

Nair, D. et al., "Bayesian Recognition of Targets by Parts in Second Generation Forward Looking Infrared Images," *Image and Vision Computing*, 2000, pp. 849-864, vol. 18.

Rao, R. et al., "Predictive Coding in the Visual Cortex: A Functional Interpretation of Some Extra-classical Receptive-field Effects," *Nature Neuroscience*, Jan. 1999, pp. 79-87, vol. 2, No. 1.

Starzyk, J.A. et al., "Spatio-Temporal Memories for Machine Learning: A Long-Term Memory Organization," *IEEE Transactions on Neural Networks*, May 2009, pp. 768-780, vol. 20, No. 5.

* cited by examiner

Correct Grouping
G11 = G21 = G38 = G46 = {a, b, c, d, e, f}

| Node | N1 | N2 | N3 | N4 | |
|---|---|---|---|---|---|
| Co-Occurences 1 | G11 | G21 | G38 | G46 | • • • |
| Co-Occurences 2 | G14 | G22 | G33 | G44 | |
| Co-Occurences 3 | G15 | G23 | G32 | G48 | |
| Co-Occurences 4 | G12 | G25 | G31 | G42 | |
| Co-Occurences 5 | G10 | G24 | G39 | G40 | |
| | • • • | • • • | • • • | • • • | |

*FIGURE 14A*

Incorrect Grouping
GA = {a, b, c}; GB = {d, e, f}

| Node | N1 | N2 | N3 | N4 | |
|---|---|---|---|---|---|
| Co-Occurences 1A | GA | G21 | G38 | G46 | • • • |
| Co-Occurences 1B | GB | | | | |
| Co-Occurences 2 | G4 | G11 | G8 | G4 | |
| Co-Occurences 3 | G5 | G3 | G2 | G8 | |
| Co-Occurences 4A | G4 | G5 | G1 | G12 | |
| Co-Occurences 5 | G12 | G4 | G9 | G10 | |
| | • • • | • • • | • • • | • • • | |

*FIGURE 14B*

FEEDBACK IN GROUP BASED HIERARCHICAL TEMPORAL MEMORY SYSTEM

RELATED APPLICATIONS

This application is related to U.S. patent application Ser. No. 11/351,437 entitled "Architecture of a Hierarchical Temporal Memory Based System," filed on Feb. 10, 2006; U.S. patent application Ser. No. 11/622,458 entitled "Belief Propagation in a Hierarchical Temporal Memory Based System," filed on Jan. 11, 2007; U.S. patent application Ser. No. 11/622,447 entitled "Extensible Hierarchical Temporal Memory Based System," filed on Jan. 11, 2007; U.S. patent application Ser. No. 11/622,448 entitled "Directed Behavior Using a Hierarchical Temporal Memory Based System," filed on Jan. 11, 2007; U.S. patent application Ser. No. 11/622,457 entitled "Pooling in a Hierarchical Temporal Memory Based System" filed on Jan. 11, 2007; U.S. patent application Ser. No. 11/622,454 entitled "Sequence Learning in a Hierarchical Temporal Memory Based System," filed on Jan. 11, 2007; U.S. patent application Ser. No. 11/622,456 filed on Jan. 11, 2007; U.S. patent application Ser. No. 11/622,455 entitled "Message Passing in a Hierarchical Temporal Memory Based System," filed on Jan. 11, 2007; and U.S. patent application Ser. No. 11/945,919 entitled "Group-Based Temporal Pooling," filed on Nov. 27, 2007, which are incorporated by reference herein in their entirety.

FIELD OF THE INVENTION

The present invention is directed toward the field of Hierarchical Temporal Memory (HTM) systems, and more particularly to HTM systems providing feedback signals from a parent node to a child node or from one component of a node to another component of the node.

BACKGROUND

Machine learning has generally been thought of and attempted to be implemented in the context of artificial intelligence. Artificial intelligence depends on algorithmic solutions (e.g., a computer program) to replicate particular human acts and/or behaviors. The study of neural networks is a sub-area of artificial intelligence which attempts to mimic certain human brain behavior by using individual processing elements that are interconnected by adjustable connections.

In human cognition, perception and understanding of phenomena happen over time and space. That is, we learn things that have a common cause based on "temporal adjacency", meaning that two phenomena occur around the same time. For example, if a child always sees lightening and then thunder, the child will learn that both phenomena have a common cause. As temporal perception is such an important mechanism in cognition, the inability to model temporal events has been a fundamental limitation of most traditional machine learning models. To this end, Hierarchical Temporary Memories (HTMs) have been developed to simulate temporal aspects of perception and learning. An HTM is a hierarchical network of interconnected nodes that individually and collectively (i) learn, over space and time, one or more causes of sensed input data, and (ii) determine, dependent on learned causes, likely causes of novel sensed input data.

One use of the HTMs is to learn temporal sequences of sensed input data that have the same cause. These sequences are used in inference to determine causes of new sequences of sensed input data. There are instances, however, when sensed inputs with the same cause do not always happen in the same sequence. Such instances can lead to a large number of similar sequences with the same cause. As learning sequences and their causes is based on the frequency at which the sequences of inputs are sensed, enumerating the frequencies of a large number of sequences can be computationally expensive. Therefore, the number of sequences needs to be limited using temporal pooling in which the sequences are grouped and stored for processing.

In such temporal pooling, the learning of temporal sequences at the HTMs may become non-optimal or inaccurate for various reasons. One cause for such non-optimal or inaccurate learning is incorrect grouping of temporal sequences. Because a child node identifies sequences and groups the sequences based on the input data provided to the child node, the child node may not be able to detect any problems in its grouping. Another reason for non-optimal or inaccurate learning is asynchronous outputting of signals from nodes at the same level. Nodes at the same level may generate output signal at different time frame due to differences in the hardware/software configurations of the nodes or different processing loads at the nodes. The parent node receiving asynchronous output of signals from nodes may identify incorrect sequences unless corrective measures are taken.

Also, the number of co-occurrences (quantization points) that can be processed at a node is restricted because of the limited computation and storage resources. Therefore, the co-occurrences to be processed at a node must be chosen carefully in a learning phase to minimize the use of computation and storage resources while maximizing the performance of the HTM. The desirability of choosing which co-occurrences to refine, merger, or discard, however, may not be apparent without any information about the grouping of the sequences.

SUMMARY

Embodiments provide a Hierarchical Temporal Memory (HTM) network comprising at least first nodes and a second node at a higher level than the first nodes where the second node provides an inter-node feedback signal to the first nodes for grouping patterns and sequences (or co-occurrences) in input data received at the first nodes. The second node collects forward signals from the first nodes; and thus, the second node has information about the grouping of the patterns and sequences (or co-occurrences) at one or more first nodes. The second node generates and provides the inter-node feedback signals to the first nodes based on the forward signals from the first nodes. The first nodes may group the patterns and sequences (or co-occurrences) at the first nodes based on the inter-node feedback signals.

Embodiments also provide a node in a Hierarchical Temporal Memory (HTM) network comprising a co-occurrence detector and a group learner providing an inter-node signal to the co-occurrence detector. The co-occurrence detector identifies the co-occurrences in patterns and sequences of training input data in a learning phase, and outputs information representing probabilities that patterns and sequences in sample input data correspond to the identified co-occurrences in an inference phase following the learning phase. A group learner groups the co-occurrences identified by the co-occurrence detector into groups based on temporal relationships between the co-occurrences. The inter-node signals include information on which co-occurrences are classified to which group.

Based on such inter-node signals, the co-occurrence detector may select co-occurrences to be split, merged, retained or discarded.

In one embodiment, the co-occurrence detector merges multiple co-occurrences into a co-occurrence based on the inter-node signal including information for merging multiple co-occurrences into one co-occurrence or splitting a single co-occurrence into multiple co-occurrences.

In one embodiment, the co-occurrence detector selects a co-occurrence to be split into multiple co-occurrences based on the proximity of the co-occurrences to a boundary of a group as indicated by an intra-node signal. The co-occurrences close to the boundary are more likely to include patterns and sequences that belong to other groups compared to the co-occurrences that are not close to the boundary. Therefore, the co-occurrences close to the boundary are selected for splitting into multiple co-occurrences.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 14A is a table illustrating an example of correctly grouped co-occurrences, according to one embodiment.

FIG. 14B is a table illustrating under-grouping of co-occurrences of FIG. 15A, according to one embodiment.

DETAILED DESCRIPTION

Figure 1:
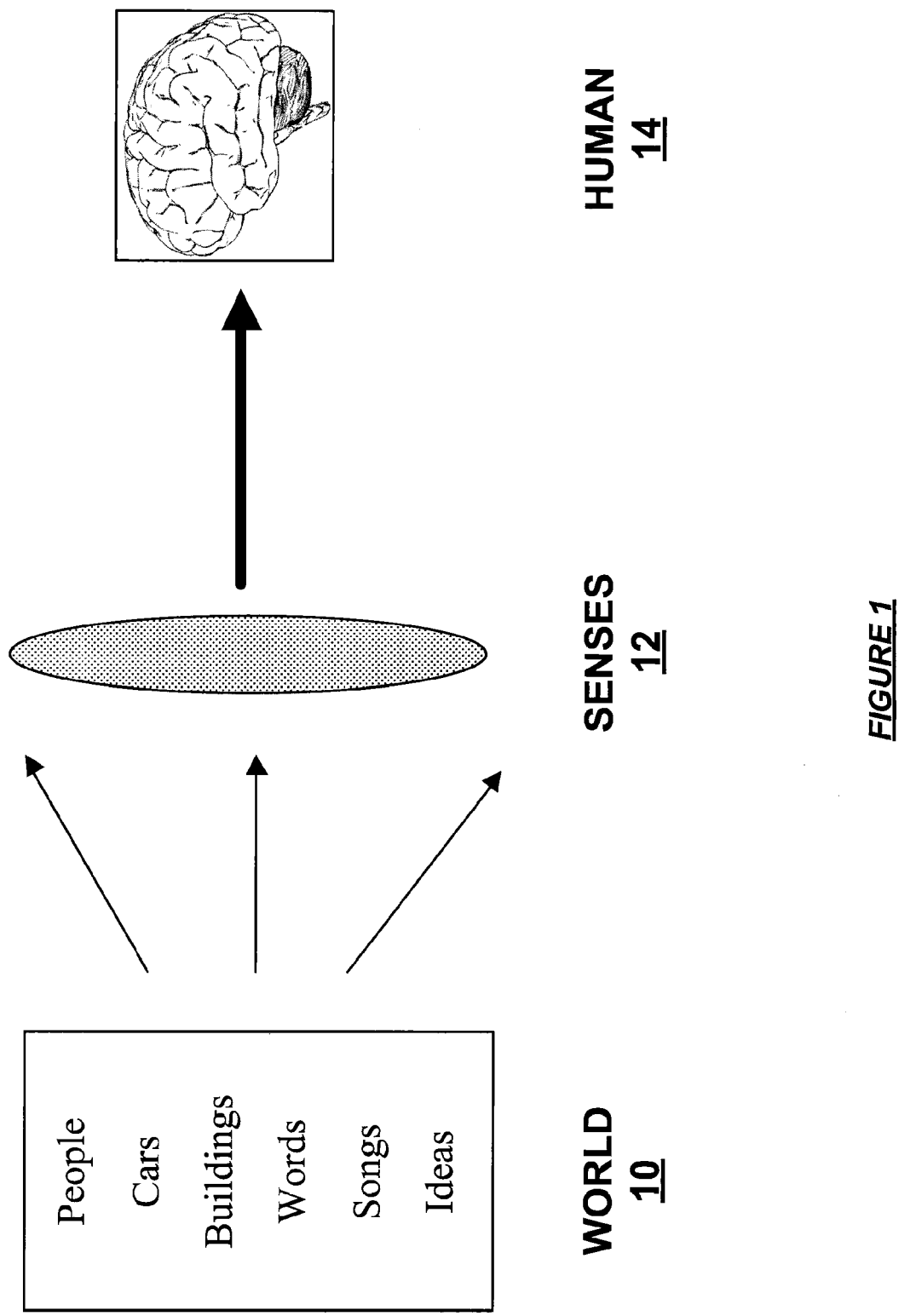
FIG. 1 is a conceptual diagram illustrating a flow of data between an object and a human.

In the following description of embodiments of the present invention, numerous specific details are set forth in order to provide a more thorough understanding of the present invention. However, note that the present invention may be practiced without one or more of these specific details. In other instances, well-known features have not been described in detail to avoid unnecessarily complicating the description.

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

Humans understand and perceive the world in which they live as a collection—or more specifically, a hierarchy—of objects. An "object" is at least partially defined as having some persistent structure over space and/or time. For example, an object may be a car, a person, a building, a word, a song, an abstract entity such as a concept or information flowing in a network.

Moreover, referring to FIG. 1, an object in the world 10 may also be referred to as a "cause" in that the object causes particular data to be sensed, via senses 12, by a human 14. For example, the smell (sensed input data) of a rose (object/cause) results in the recognition/perception of the rose. In another example, the image (sensed input data) of a dog (object/cause) falling upon a human eye results in the recognition/perception of the dog. Even as sensed input data caused by an object change over space and time, humans want to stably perceive the object because the cause of the changing sensed input data, i.e., the object itself, is unchanging. For example, the image (sensed input data) of a dog (object/cause) falling upon the human eye may change with changing light conditions and/or as the human moves; yet, however, the human is able to form and maintain a stable perception of the dog.

In embodiments of the present invention, learning causes and associating novel input with learned causes are achieved using what may be referred to as a "hierarchical temporal memory" (HTM). An HTM is a hierarchical network of interconnected nodes that individually and collectively (i) learn, over space and time, one or more causes of sensed input data and (ii) determine, dependent on learned causes, likely causes of novel sensed input data. HTMs, in accordance with one or more embodiments of the present invention, are further described below with reference to FIGS. 2-19B.

HTM Structure

Figure 2:
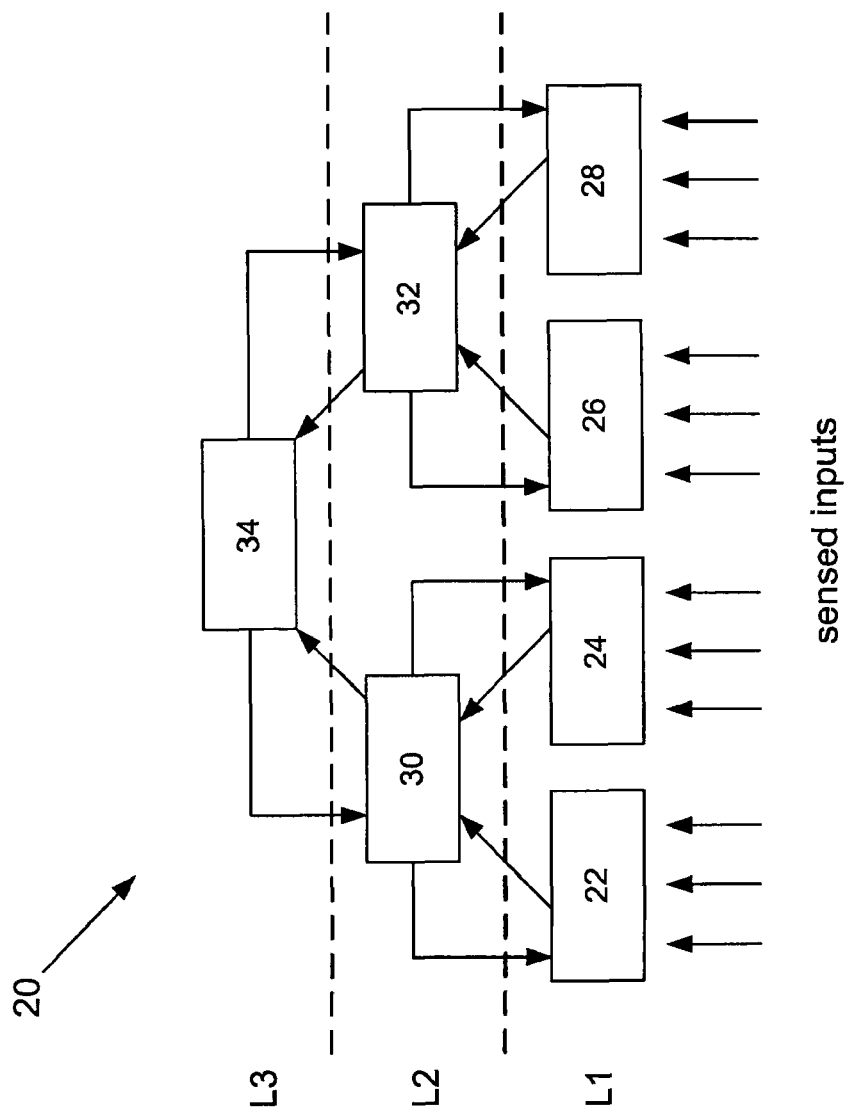
FIG. 2 is a block diagram illustrating a Hierarchical Temporal Memory (HTM) based system according to one embodiment.

An HTM has multiple levels of nodes. For example, as shown in FIG. 2, HTM 20 has three levels L1, L2, L3, with level L1 being the lowest level, level L3 being the highest level, and level L2 being between levels L1 and L3. Level L1 has nodes 22, 24, 26, 28; level L2 has nodes 30, 32, and level L3 has node 34. The nodes 22, 24, 26, 28, 30, 32, 34 are hierarchically connected in a tree-like structure such that each node may have several children nodes (i.e., nodes connected at a lower level) and one parent node (i.e., node connected at a higher level). Each node 22, 24, 26, 28, 30, 32, 34 may have or be associated with a capacity to store and process information. For example, each node 22, 24, 26, 28, 30, 32, 34 may store sensed input data (e.g., sequences of patterns) associated with particular causes. Further, each node 22, 24, 26, 28, 30, 32, 34 may be arranged to (i) propagate information "forward" (i.e., "up" an HTM hierarchy) to any connected parent node and/or (ii) propagate information "back" (i.e., "down" an HTM hierarchy) to any connected children nodes.

The nodes are associated or coupled to each other by links implemented as hardware or software. A link represents logical or physical relationship between an output of a node and an input of another node. Outputs from a node in the form of variables are communicated between the nodes via the links.

Inputs to the HTM 20 from, for example, a sensory system, are supplied to the level L1 nodes 22, 24, 26, 28. A sensory system through which sensed input data is supplied to level L1 nodes 22, 24, 26, 28 may relate to commonly thought-of human senses (e.g., touch, sight, sound) or other human or non-human senses.

The range of sensed input data that each of the level L1 nodes 22, 24, 26, 28 receive may be a subset of an entire input space. For example, if an 8×8 image represents an entire input space, each level L1 node 22, 24, 26, 28 may receive sensed input data from a particular 4×4 section of the 8×8 image. Each level L2 node 30, 32, by being a parent of more than one level L1 nodes 22, 24, 26, 28, covers more of the entire input space than does each individual level L1 nodes 22, 24, 26, 28. In FIG. 2, the level L3 node 34 covers the entire input space by receiving, in some form, the sensed input data received by all of the level L1 nodes 22, 24, 26, 28. Moreover, in one or more embodiments, the ranges of sensed input data received by two or more nodes 22, 24, 26, 28, 30, 32, 34 may overlap.

While HTM 20 in FIG. 2 is shown and described as having three levels, an HTM in accordance with one or more embodiments of the present invention may have any number of levels. Moreover, the hierarchical structure of an HTM may be different than what is illustrated in FIG. 2. For example, an HTM may be structured such that one or more parent nodes have three children nodes as opposed to two children nodes like that shown in FIG. 2. Further, in one or more embodiments of the present invention, an HTM may be structured such that a parent node in one level of the HTM has a different number of children nodes than a parent node in the same or another level of the HTM. Further, in one or more embodiments of the present invention, an HTM may be structured such that a parent node receives input from children nodes in multiple levels of the HTM. In general, there are various alternative ways to structure an HTM other than as illustrated in FIG. 2.

Learning Causes

As described above, an "object" has persistent structure. The persistent structure causes persistent patterns to be sensed by an HTM. Each sensed input pattern has one or more spatial attributes. In other words, each sensed input pattern may be thought of as being represented as a particular set of bits. In general, a node in an HTM "learns," i.e., stores and associates with a common cause, sensed input patterns by determining "temporal co-occurrences" and "temporal adjacencies" of sensed input patterns in its input. Determining co-occurrences and adjacencies of sensed input patterns involves determining which sensed input patterns are active at around the same time at a rate statistically greater than what would be expected based on mere chance. For example, if an HTM node having one hundred input patterns have seven input patterns that occur concurrently at statistically significant rate, then the HTM node learns that seven input patterns. Such input patterns are hereinafter referred to as "co-occurrences."

Further, in one or more embodiments, it may not be necessary for an HTM node to learn all input patterns occur together at some statistically significant rate. For example, an HTM node may store the x most commonly input patterns received at its input. Alternatively, an HTM node may store sensed input patterns according to a pre-defined measure of significance (e.g. uniqueness). In such case, the co-occurrence may also be referred to as a "quantization point" because two or more similar input patterns are quantized into a single co-occurrence. The pre-defined measure of significance may be, for example, Euclidean distance or hamming distance between the input patterns.

In addition to an HTM node learning commonly occurring sensed input patterns as described above, the HTM node learns temporal groups of those learned sensed input patterns. A particular temporal group of co-occurrences may be learned by recognizing that the sensed input patterns occur together at a rate statistically greater than what would be expected by mere chance. For example, if three input patterns of fifty sensed input patterns occur in order at statistically significant rate, then the HTM node may learn that group of sensed input patterns.

The assignation of patterns to temporal groups representing a single cause enables the application of HTMs to single point or "flash inference" problems in which an unknown single pattern or input is to be assigned a cause. Although, temporal groups are learned over time by the group learner, there needs to be no temporal information associated with the newly sensed input or pattern upon which inference is performed. In this way, temporal grouping or "pooling" allows the exploitation of temporal co-occurrence in the learning stage but does not require temporal information for inference. This type of inference may be applied in image recognition systems trained on temporal data such as face recognition systems, medical image classification systems and satellite image recognition. Flash inference may also be applied to audio data such as in speaker identification. Other applications of flash inference include monitoring engine and electronics data, climate and weather modeling and prediction and stock market prediction.

In one or more embodiments of the present invention, the groups learned by an HTM node may each be represented by one or more variables. As each learned group is associated with a particular cause, each variable accordingly represents a different cause. The HTM node may send each of the variables to a parent node via a vector containing probabilities as to the likelihood that each of its learned groups is active at its input at a given time. The parent node may then (i) determine temporal adjacencies of its sensed input patterns (i.e., the variables received from its child node), (ii) learn sensed input patterns as described above, and (iii) learn high-order groups of learned sensed input patterns (i.e., learn groups of temporally co-ocurring variables representing groups learned by its child node).

Spatial Pooling

As described above, learning causes in an HTM-based system involves learning patterns and groups of patterns. In general, patterns and groups of patterns that co-occur frequently are stored and assigned as a co-occurrence. For example, groups of patterns that co-occur frequently at statistically significant rate may be assigned to the same cause. Accordingly, learning causes may effectively entail mapping many patterns and/or inputs to a single cause. Such assigning of multiple patterns and/or inputs to a single cause may also be referred to as "pooling."

In one or more embodiments of the present invention, pooling may be dependent on "spatial" similarities between two or more patterns (noting that a pattern may actually represent a sequence from a lower level). The similarities or uniqueness of the input patterns may be computed based on, for example, Euclidean distance or hamming distance between the input patterns. In such embodiments, an HTM node may compare a spatial property of a received sensed input pattern with that of a learned co-occurrence. If the two patterns are "similar enough"(i.e., have enough "overlap" or the distance between the patterns are within a threshold), then the received sensed input pattern may be assigned to the same cause as that of the learned co-occurrence.

In one embodiment, the hamming distance is used to determine similarities or uniqueness of the input patterns. For example, if a co-occurrence includes eight (8) variables of {1, 0, 0, 1, 0, 1, 1, 0}, and a sensed input pattern {1, 0, 0, 1, 1, 1, 1, 0} is fed to the node, the co-occurrence and the sensed input pattern may be assigned to the same cause if the threshold for pooling is more than one bit difference. The similarity (or threshold) of the patterns for such "spatial" pooling may vary within and/or among HTM-based systems.

In one embodiment, Euclidean distance is used to determine similarities or uniqueness of the input patterns. For example, assume that the input patterns have two variables representing vertical and horizontal coordinate values. Assume also that an input pattern of $x_1=\{1, 5\}$(x-coordinate is 1 and y coordinate is 5) occurs at a statistically significant rate; and therefore, is classified as a co-occurrence. If the threshold of significance or uniqueness is set to Euclidean distance of 2 (i.e., threshold is set to 2), an input pattern of $x_2=\{2, 5\}$ is classified to the co-occurrence $x_1$ (increasing the count of the co-occurrence $x_1$) because the distance is only one (1). In contrast, an input pattern of $x_3=\{4, 5\}$ has Euclidean distance of three (3) from the co-occurrence $x_1$; and thus, $x_3$ may create a new co-occurrence (if input pattern $x_3$ or similar patterns occur at a statistically significant rate).

Figure 3:
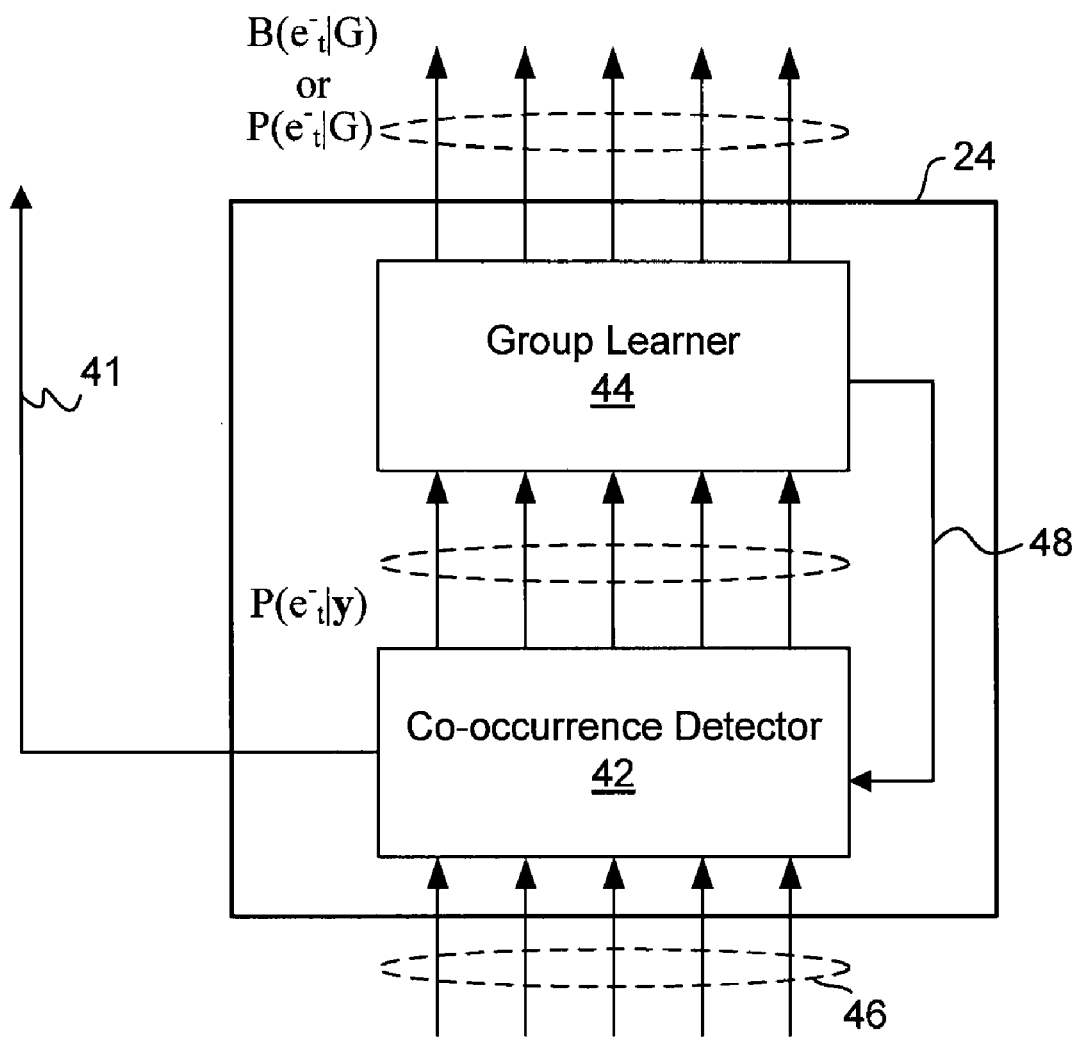
FIG. 3 is a block diagram illustrating a node of the HTM, according to one embodiment.

Referring to FIG. 3, the co-occurrence detector 42 performs the function of spatial pooling the input patterns 46. The co-occurrence detector 42 receives input patterns 46 and identifies co-occurrences among input patterns. After a learning phase or during a learning phase, the co-occurrence detector 42 outputs a probability distribution $P(e^-_t|y)$. The probability distribution $P(e^-_t|y)$ represents the probability of observing $e^-$ (evidence from a lower level) at time t when in state y. The distribution $P(e^-_t|y)$ is a vector in which each entry corresponds to a different y, where y represents some state of a world to which node 24 is exposed. Thus, for example, at time t, the first entry in $P(e^-_t|y)$ is $P(e^-_t|y_1)$, the second entry is $P(e^-_t|y_2)$, and so forth. In one embodiment, the co-occurrences are communicated outside of the co-occurrences detector 42.

In one embodiment, the co-occurrence detector 42 generates a forward signal 41 for generating a feedback signal, as described in detail below with reference to FIG. 12A to FIG. 15. The forward signal 41 is received and processed by a parent node of the node 24 into the inter-node feedback signals for and propagation to the sibling nodes, for example, to improve grouping of the co-occurrences at the sibling nodes.

Temporal Group Learning

Temporal group learning involves learning frequently received co-occurrences at a HTM node and outputting a probability that a given input element corresponds to the co-occurrences. FIG. 3 is a block diagram illustrating a node 24 having a temporal group learning functionality. The group learner 44 of FIG. 3 performs the function of temporal group learning.

Based on the distributions outputted over time by the co-occurrence detector 42, the group learner 44 groups and classifies the co-occurrences into groups, and outputs a belief vector $B(e^-_t|G)$ or distribution $P(e^-_t|G)$. The belief vector $B(e^-_t|G)$ and $P(e^-_t|G)$ represent the probability of observing $e^-$ (evidence from a lower level) at time t over learned groups G. The distribution $P(e^-_t|G)$ is essentially the same as the belief vector $B(e^-_t|G)$ except that the distribution $P(e^-_t|G)$ is a normalized version of the belief vector $B(e^-_t|G)$. Thus, each entry in the belief vector $B(e^-_t|G)$ or distribution $P(e^-_t|G)$ corresponds to a different learned group $G_i$. In one or more embodiments, the learned groups themselves (e.g., which groups contain which co-occurrences) may not be communicated outside of the group learner 44. Further, the group learner 44 may perform the grouping process (i.e., outputting distributions over learned groups of sensed input patterns) independent of a type and/or topology of network of which the group learner 44 is part.

Figure 4:
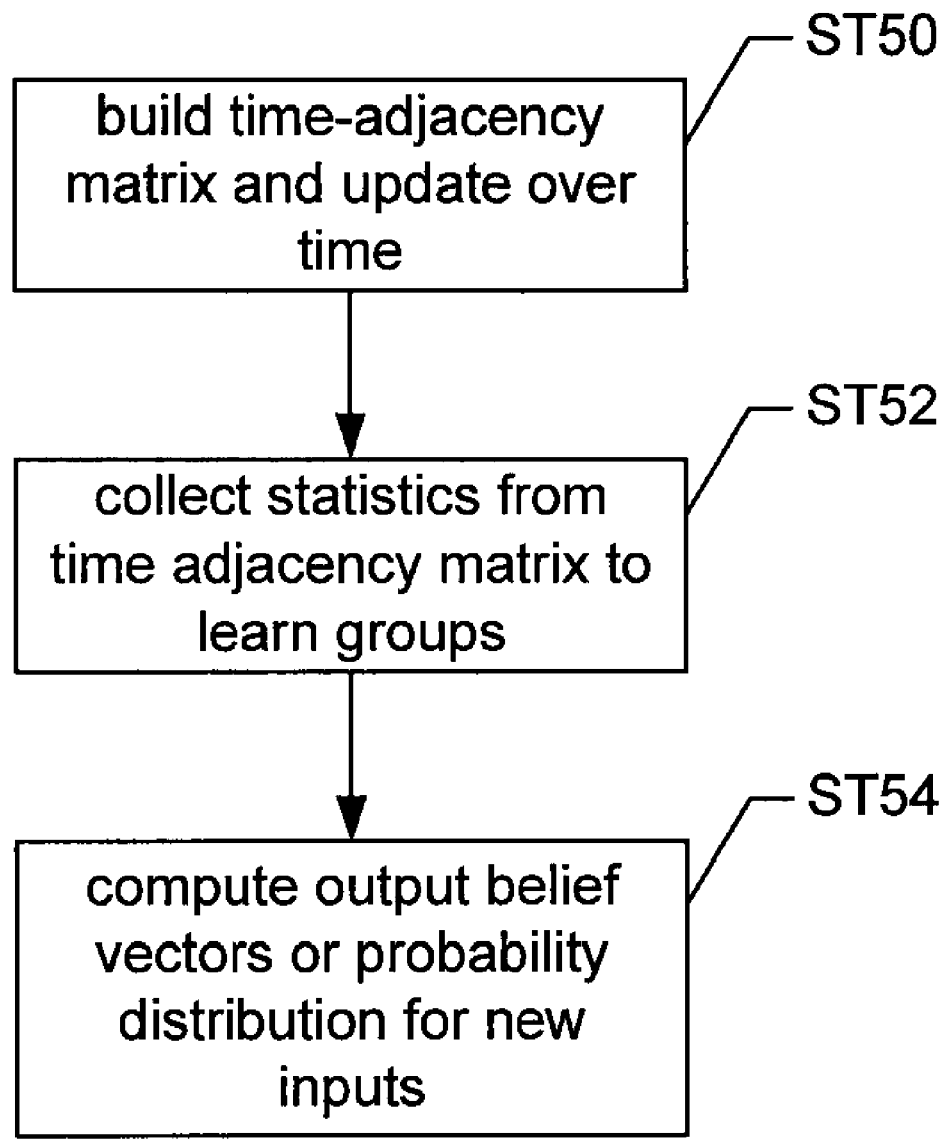
FIG. 4 is a flowchart illustrating a method for operating a group based HTM, according to one embodiment.

As described above, y represents some state of a world as understood by the system. Note that the statistical nature of the world is such that the states are likely to occur together over time. As shown in FIG. 4, to learn groups in its world, a group learner (e.g., 44 in FIG. 3) builds ST50 a time-adjacency matrix that is updated over time. Further, the group learner is arranged to collect ST52 statistics from the time-adjacency matrix to learn temporal groups and then, based on its learned groups and statistics thereof, compute ST54 probability distributions for new inputs (as described above).

The group learner 44 generates an intra-node feedback signal 48 that is fed to the co-occurrence detector 42, as described below in detail with reference to FIGS. 16 to 19B. The intra-node feedback signal 48 is provided to the co-occurrence detector 42, for example, to refine the identification of the co-occurrences, merge or split the co-occurrences, or to prune certain co-occurrences.

Group Based Temporal Pooling

In one or more embodiments of the present invention, pooling may involve assigning patterns to the same group based on temporal adjacency. For example, if an HTM node receives pattern A followed by pattern B followed by pattern D, then patterns A, B, and D may be assigned to the same group as there is some likelihood that this sequence of patterns was caused by the same object. Accordingly, such "temporal" pooling enables the mapping of patterns, some or all of which may have no significant spatial overlap, to a single cause.

Figure 5:
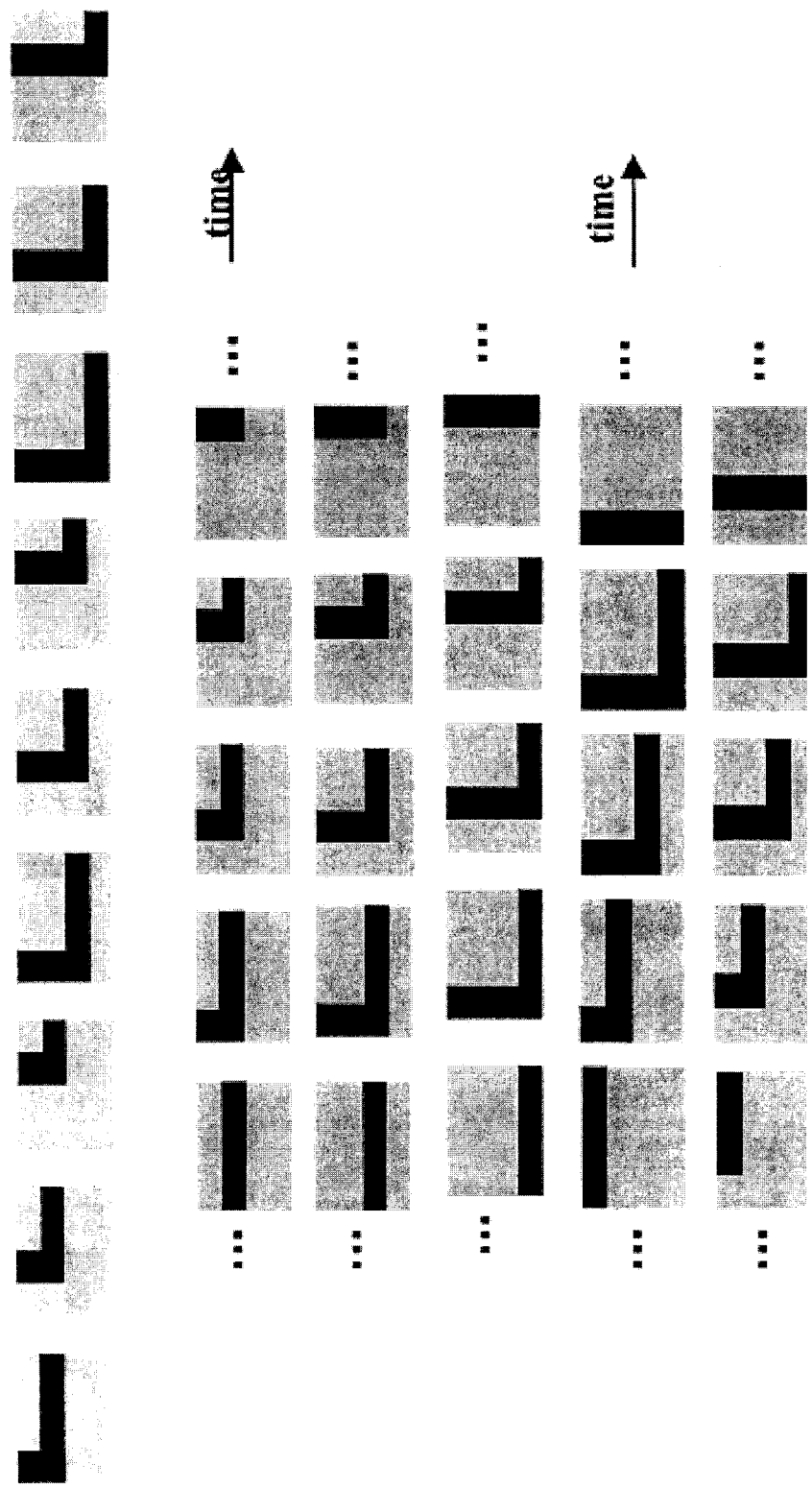
FIG. 5 is a diagram illustrating the operation of a group learner of FIG. 3, according to one embodiment.

FIG. 5 illustrates an example of sensing or perceiving a right corner moving in and out of vision. Although the individual sequences of input patterns may represent the same input of a right corner, the sequences of viewing the corner moving into view may be interspersed over time. Additionally, not all of the sequences of patterns representing the right corner are comprised of the exact same image or pattern but instead patterns which represent the same cause.

As discussed above, one limitation of temporal pooling based strictly on sequential patterns is that this technique often causes a large number of sequences to be created and grouped. When inputs or patterns of inputs with the same cause are sensed in real life, it is not always the case that they adhere to the same sequence every time. Random noise and variety in the order which inputs or patterns are sensed can create a large number of sequences of events, which all have the same cause. Due to different orders in which inputs can be sensed, a large number of patterns which have the same cause can create a combinatorial explosion when considering all possible sequences the patterns can form. Enumerating all of the possible different sequences is not only computationally expensive but often inaccurately reflects the frequency with which patterns co-occur. Promiscuous sequences can sometimes lead to an even or "flat" distribution in frequencies of temporal adjacencies. This "flat" distribution can occlude the detection of differences in frequency of temporal adjacency due to a common cause.

Group based temporal pooling addresses these problems in temporal and spatial pooling by identifying groups of input patterns thought to have the same cause by identifying temporal adjacency between inputs without relying on the sequence of occurrence of these inputs. Temporal adjacency is used herein to refer to two input patterns occurring concurrently as well as close in time point to each other such as directly before or after each other (temporally adjacent) or close to each other in a sequence of inputs over time (temporally proximal). In temporal adjacency, the order in which the input patterns occur can be symmetrical or asymmetrical. In other words, the identified temporal adjacency values may be based or the order the inputs occur (e.g., A . . . B is not equivalent to B . . . A) or independent of the order the input occur (i.e., A . . . B is equivalent to B . . . A). In most embodiments, the groups identified by group based temporal pooling are unordered, meaning that there is no inherent structure or sequence in which the input patterns occur within the group. However, in alternate embodiments, the input patterns may be partially ordered in a group based on various criteria such as frequency of occurrence.

In one embodiment, temporal adjacency is enumerated for each of the input patterns in a time-adjacency matrix. Each row in the time adjacency matrix represents a sensed input pattern for a time point. Each column in the time adjacency matrix also represents a sensed input pattern. The matrix is enumerated to reflect the frequency of temporal adjacency. At each time point t, the matrix is updated at the row corresponding to the input at time t and the column corresponding to the input that occurred at the previous time point $W_{t-1}$. According to one or more embodiments, the matrix is also updated at several previous time points. The number of time points can range from 1 to n, where n represents all previous all time points used to update the matrix. According to the embodiment, n may be parameterized or take a default value. The matrix may be updated with an integer number which enumerates the number of times the input at time t and the input at time $W_{t-1}$ are temporally adjacent, or any alternative numeric variable to represent the frequency of temporal adjacency. Additionally, alternative data structures may be used to score temporal adjacency.

Figure 6A:
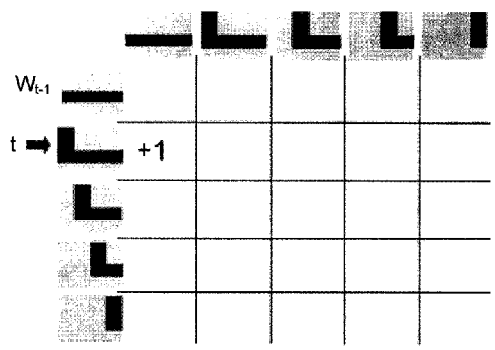
FIGS. 6A-6D are diagrams illustrating four consecutive updates of a time-adjacency matrix, according to one embodiment.
Figure 6B:
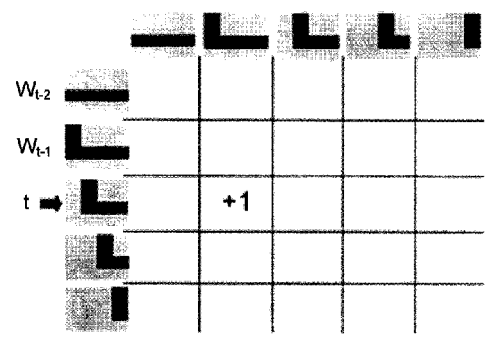
Figure 6C:
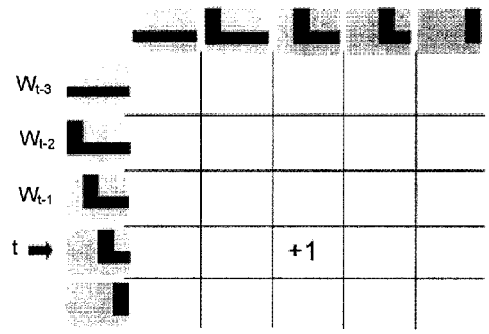
Figure 6D:
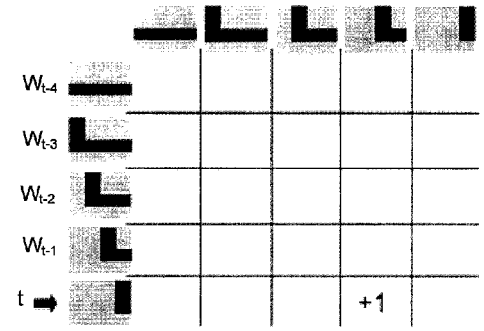

Four consecutive updates of a time adjacency matrix are illustrated in FIGS. 6A-D. In FIG. 6A the row corresponding to the pattern at time t is updated at the column corresponding to the pattern at time $W_{t-1}$ to add an integer value of 1. The increment of +1 represents an update to a value representing the frequency of temporally adjacency of the two patterns. In FIG. 6B, the time point is advanced such that the previous times t and $W_{t-1}$ are now respectively $W_{t-1}$ and $W_{t-2}$. The matrix is again updated at the column corresponding to the pattern of $W_{t-1}$ and the row corresponding to the pattern of time t. FIGS. 6C and 6D illustrate two additional consecutive updates of the time-adjacency matrix.

In embodiments where the matrix is updated for temporal adjacency up to $W_{t-n}$ where n>1, a decay function can be used to weight the enumeration of temporal adjacency. The decay functions may be linear in proportion to n, which represents the number of time points between t and $W_{t-n}$. Alternatively, the decay function may be exponential or pseudo-exponential over time. Examples of suitable decay functions to weight temporal adjacency by proximity include but are not limited to: persistence decay functions, block decay functions, and exponential decay functions. According to one or more embodiments, the decay function may be adjusted to weight temporally proximal patterns with a greater or lesser weight.

Figure 7A:
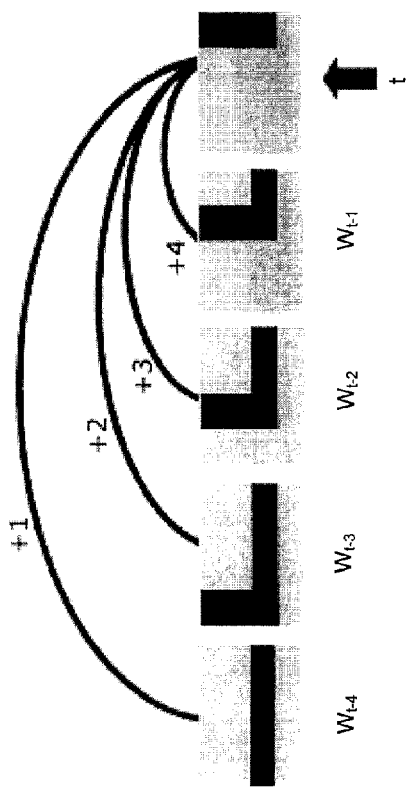
FIGS. 7A and 7B are diagrams illustrating a decay function and updating of the time-adjacency matrix using a decay-function, according to one embodiment.
Figure 7B:
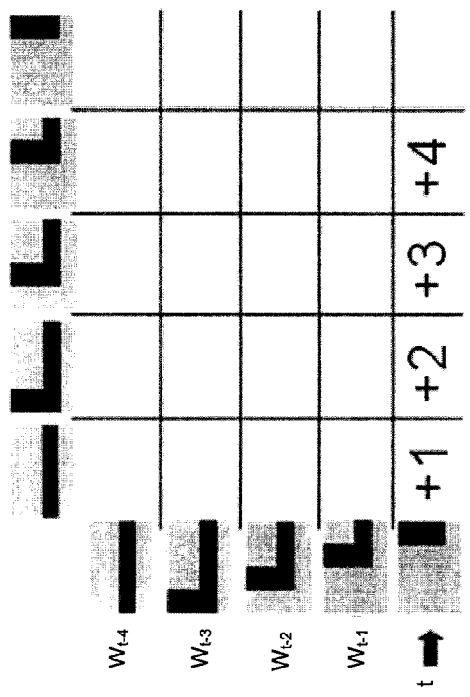

FIGS. 7A and 7B illustrate a linear decay function using the integer based enumeration shown in FIGS. 6A-D. FIG. 7A illustrates a decay function which is linearly proportional to n, where n equals 4. In FIG. 7A, the maximum number used to enumerate the temporal adjacency is 4 for $W_{t-1}$. Each pattern at the previous time points ($W_{t-2}$, $W_{t-3}$, $W_{t-4}$) is assigned an integer value which reflects its temporal distance relative to the pattern at time t. In the example illustrated, the linear decay function subtracts one integer value for every time point between the enumerated pattern and the pattern at time t. FIG. 7B illustrates one update of the time adjacency matrix using the decay function. In FIG. 7B, the row representing the pattern at time t is updated at the columns representing patterns at $W_{t-1}$, $W_{t-2}$, $W_{t-3}$ and $W_{t-4}$ with values 4, 3, 2 and 1, respectively.

In addition to temporal proximity, the enumeration of the time adjacency matrix is also weighted to reflect spatial proximity of the patterns in some embodiments. In systems where a large number of potential patterns may exist, it may be necessary to represent new patterns using a set of co-occurrences or by defining a threshold on the number of input patterns to include in the time-adjacency matrix. As discussed above, co-occurrences may be determined based upon frequency of occurrence. Co-occurrences may also be determined using standard machine learning techniques such as principle components analysis. Alternatively, co-occurrences may be determined using other unsupervised learning methods such as Gaussian clustering. According to one or more embodiments, the number of co-occurrences may be parameterized by specifying the number of input patterns to include in the time-adjacency matrix.

Similarity to existing patterns or co-occurrences may be determined in a number of ways using conventional methods. As described above, in some embodiments, each pattern may be assigned a set of features and similarity may be determined between two patterns using a variety of distance functions. The set of features and distance functions may be specific to the type of pattern used and the application of the pooled groups. For example, patterns comprised of images may be compared using distance functions based on image-based features such as pixel color, luminescence, etc. Patterns comprised of sequences may be compared using distance functions including mismatch values and gapped alignments. Additional similarity metrics and distance functions may also be used.

In situations where a new input is similar to more than one existing inputs, the new pattern may be assigned to multiple different existing inputs to represent spatial proximity. Assignment of new inputs to multiple existing inputs is used to enumerate several existing patterns based one new input, instead of creating a new row in the time-adjacency matrix representing every input not previously sensed by the system. According to one or more embodiments, the temporal adjacency enumeration value may be multiply divided over several images in any suitable method. If similarity is probabilistically determined using machine learning methods, assignment to multiple inputs may correspond to the probability the two images are the same. Alternatively, assignment to multiple inputs may be based on one or more similarity values.

Figure 8A:
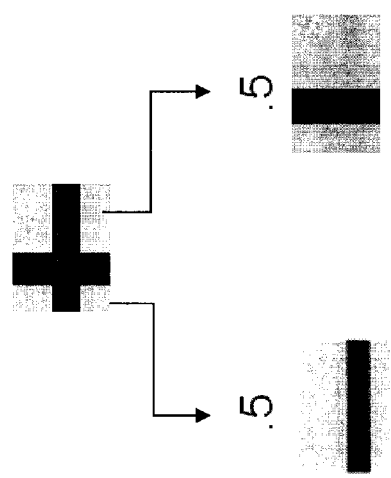
FIG. 8A is a diagram illustrating a sensed input assigned to multiple co-occurrences, according to one embodiment.
Figure 8B:
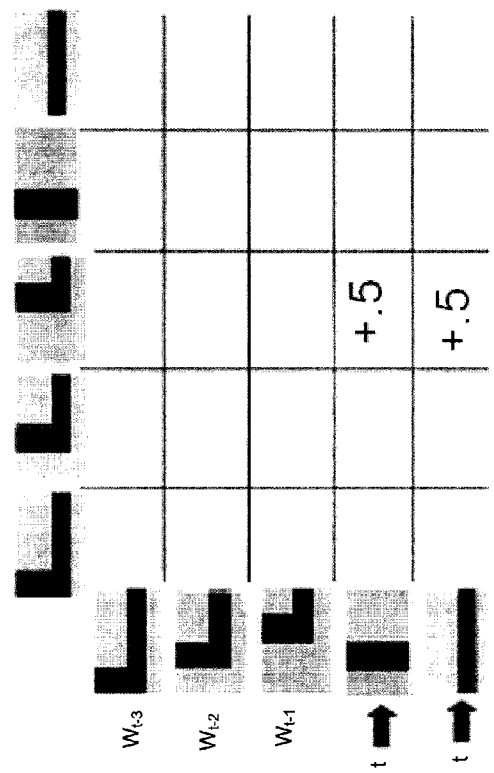
FIG. 8B is a diagram illustrating updating of the time-adjacency matrix using multiple assignment of a sensed input, according to one embodiment.

The concept of multiple assignment is illustrated in FIG. 8A. In this illustration, the image of the intersection of perpendicular horizontal and vertical lines has both high similarity to the images of the horizontal line and the image of the vertical line. Both the images of the horizontal line and the vertical line are assigned a value of ½ or 0.5 of a temporal adjacency enumeration value of 1. In FIG. 8B, the rows corresponding to both the horizontal line image and the vertical line image are updated at time t at the column corresponding to the image of time $W_{t-1}$.

Figure 9A:
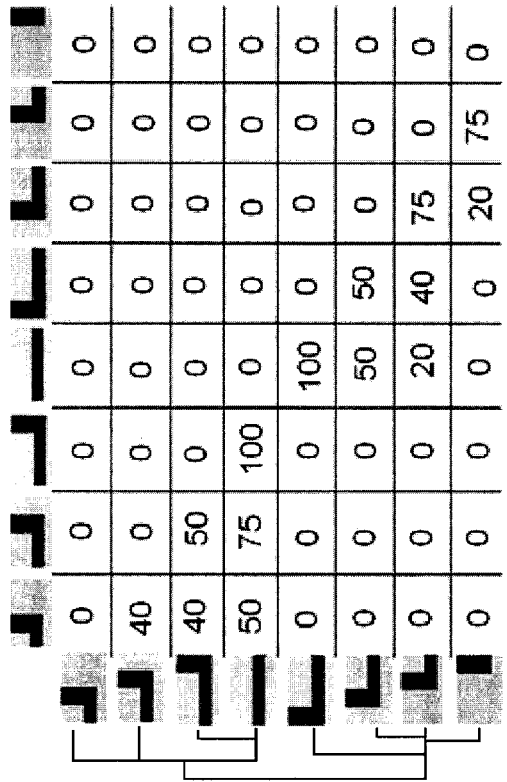
FIG. 9A is a diagram illustrating a time-adjacency matrix according to one embodiment.

Once the time-adjacency matrix is fully updated, the groups of sensed input patterns are identified. FIG. 9A illustrates a simple example of a complete time-adjacency matrix with two distinct groups of input patterns, a set of right corners and a set of left corners. Upon inspection of the time-adjacency matrix, it is clear that the two groups distinctly co-occur with each other only (there are never any left corners in the columns enumerated for the right corners) and are separate entities. The only pattern (i.e. image) that has overlap between the two groups is that of the straight line, which temporally co-occurs or is adjacent to both the left corner and the right corners. If the pattern representing the straight line is removed from the time-adjacency matrix, the right corners and left corners would form two separate and distinct groups.

Figure 9B:
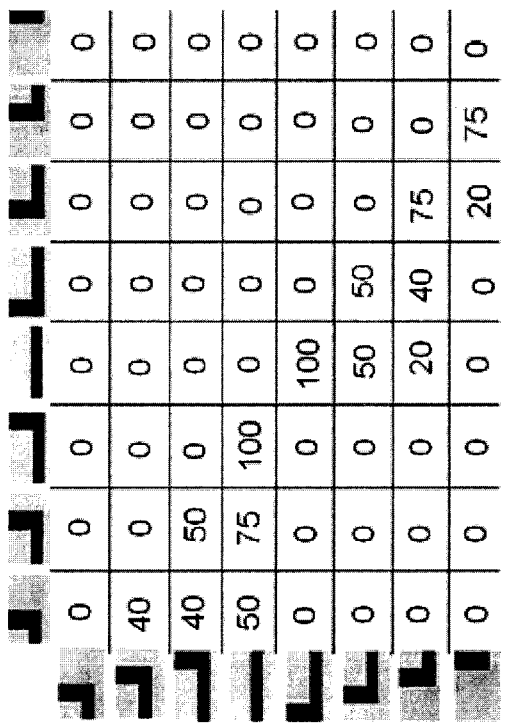
FIG. 9B is a diagram illustrates clustering of a time-adjacency matrix of FIG. 9A according to one embodiment.

In one embodiment, these groups are identified using hierarchical agglomerative clustering or any method of "hard" clustering wherein each row of the time-adjacency matrix is assigned to only one cluster or group. In one embodiment, the clustering algorithm may learn a number of clusters reflective of the natural groups of input patterns. Alternatively, the clustering algorithm may take a number of clusters to form as a parameter. The identification of the two groups of input patterns through clustering is illustrated in FIG. 9B. Suitable clustering methods include single linkage clustering and n-means clustering. In this type of clustering, the temporal adjacencies enumerated in each row of the matrix form the set of values used to pair-wise similarities between the two input patterns. Any type of distance metric can be employed to determine the pair-wise similarities which are then used to cluster or group the rows representing the input patterns.

Figure 10B:
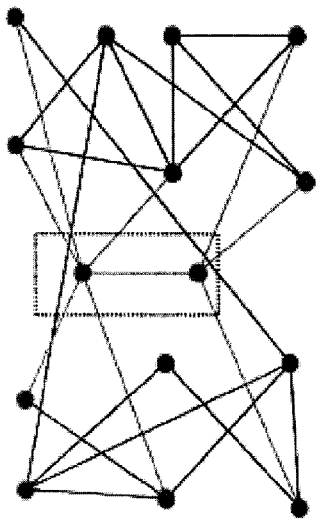
FIG. 10B is a graph illustrating selection of co-occurrences in the graph according, according to one embodiment.
Figure 10A:
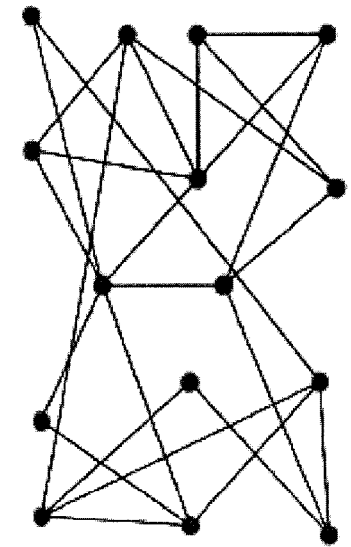
FIG. 10A is a graph illustrating relationship between co-occurrences as represented by a time-adjacency, according to one embodiment.
Figure 10D:
FIG. 10D is a diagram illustrating a time-adjacency matrix according to one embodiment.
Figure 10C:
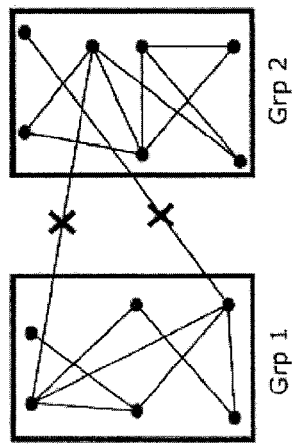
FIG. 10C is a graph illustrating grouping of the co-occurrences into three groups, according to one embodiment.

In some embodiments, the groups are identified though a method which employs a greedy graph traversal to identify cliques or groups of co-occurring patterns. This method relies on the principle of graph connectivity to identify and remove patterns which have overlap between multiple groups. This concept is illustrated in FIGS. 10A-C. FIG. 10A depicts a graphic illustration of a time adjacency matrix wherein each pattern is represented by a node in the graph and each edge between the nodes in the graph indicates temporal adjacencies between the two patterns. In FIG. 10B, the two center nodes are identified as a distinct group of having high connectivity to other nodes. Each node is connected to four other nodes, causing both of the center nodes have a high sum of temporal adjacency values due to increased connectivity. However, the two center nodes have low temporal adjacency values with the other nodes, having the largest temporal adjacency value with each other. In FIG. 10C the identified group of center nodes (Group 0) is removed from the graph, forming two other distinct sub-graphs representing the remaining groups (Group 1 and 2).

This method of identifying groups based on the time-adjacency matrix works well because there are several patterns which will be over-represented or sensed more frequently than others, leading to both higher connectivity and also higher likelihood of connectivity (i.e. a high number of temporal adjacencies) with input patterns in multiple groups. Because the rows representing these frequently sensed patterns will be enumerated at each time point, the row representing pattern will have a large value when summed. The inequity in the frequency of different patterns produces an uneven distribution over the sum of the rows of the matrix. The sum of the rows of the matrix can then serve as an indicator of the relative frequency of temporal adjacency or "connectivity" of each pattern. This concept is also illustrated in FIG. 9A by the straight line having the highest frequency of occurrence while not having the same cause as the right corners or the left corners. In FIG. 10D each rows of the matrix in FIG. 9A is summed, indicating that the straight line has both the highest temporal connectivity with each other pattern corresponding to its temporal adjacency with multiple groups.

In one embodiment of the present invention, a greedy algorithm is used to identify groups based on the above discussed connectivity as an indicator of group overlap. The greedy algorithm works by the principle of identifying for each sensed input pattern the nearest neighbors, that is, the sensed input patterns which have the highest frequency of temporal adjacency based on the time-adjacency matrix. In this embodiment, the group is defined as the smallest set of elements in which every element's closest topN neighbors are in the group. The topN neighbors are the highest N neighbors according to the sorted rankings representing temporal adjacency, where N is a numeric value. According to the specific embodiment, the greedy algorithm may be parameterized to allow the user to specify the N number of nearest neighbors of each element to be contained in each group. In one or more embodiments, the topN parameter may have as default value of 1.

Other parameters to allow the user to control the greedy algorithm include maxGroupSize and minGroupSize. maxGroupSize allows the user to specify a maximum number of elements in a group and provides the user the ability to ensure that not all elements will be grouped into one group. minGroupSize allows the user to specify a minimum number of elements to be contained within each group, thereby allowing the user to control spurious small groups. These parameters are specific to the embodiment discussed, but other constraints on group size and connectivity may also be used.

Figure 11:
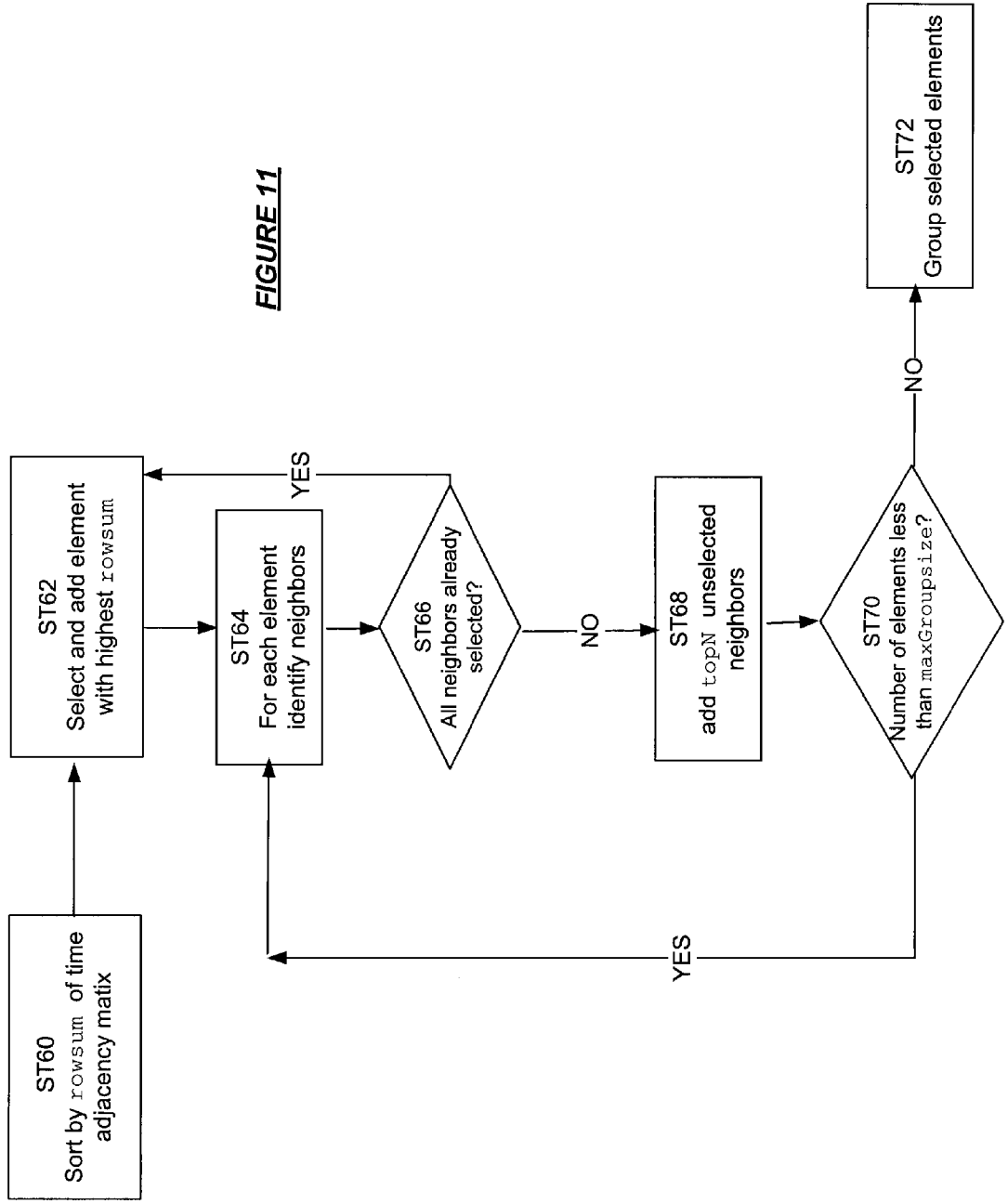
FIG. 11 is a flowchart illustrating a method of grouping the co-occurrences, according to one embodiment.
Figure 12A:
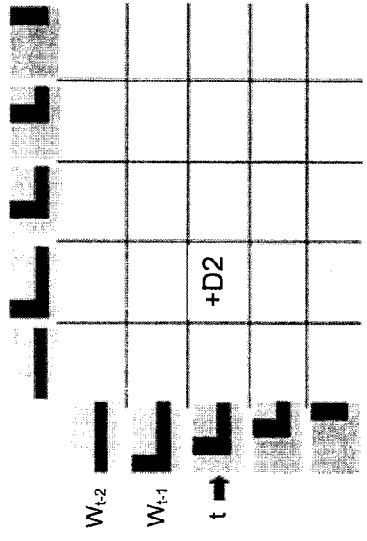
FIGS. 12A-12D are diagrams illustrating updating of the time-adjacency matrix with different increments, according to one embodiment.
Figure 12B:
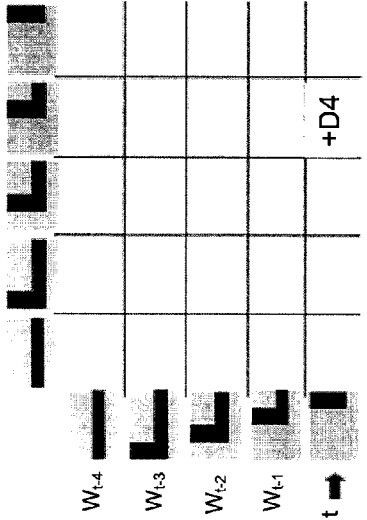
Figure 12C:
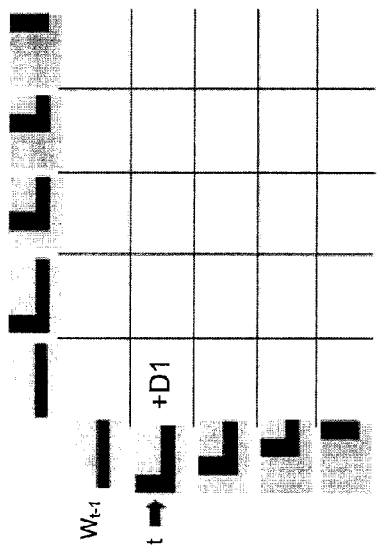
Figure 12D:
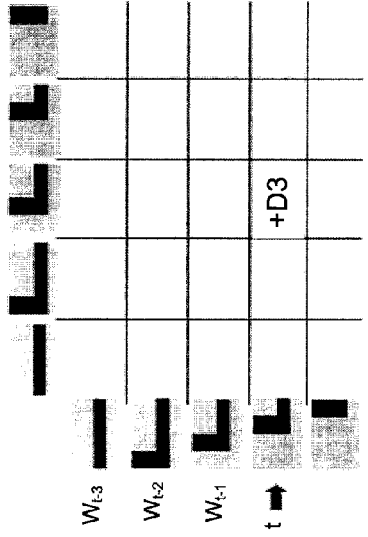

FIG. 11 illustrates a flow chart illustrating the greedy algorithm according to one embodiment. Initially, the time-adjacency matrix is sorted by rowSum values in order to rank the rows representing different inputs according to their frequency of occurrence ST60. The element with the highest rowSum is selected and added to the group ST62. The neighbors of the first selected element are identified in the time-adjacency matrix by determining which elements correspond to enumerated columns with in the row of the selected element ST64. The identified neighbors are checked to determine if all of the neighbors have already been selected ST66. If not, the identified neighbors are then sorted according the numeric value in of their corresponding columns in the time-adjacency metric which represents the temporal adjacency of the each neighbor relative to the first selected element. A number of elements equal to the lesser of the number of neighbors remaining unselected or the topN neighbors is then selected for addition to the group ST68. If the number of elements in the group after addition is less than maxGroupsize, the method is repeated with all the elements of the group ST70.

In one embodiment, a tie breaking heuristic is used to determine which element to add to the group. In one embodiment, the original ranking of rowSum is used to determine the element with the highest frequency of occurrences of the two elements and add it to the group. For example, if the value of topN is 3 and the respective values of the top 4 neighbors are {9,8,4,4} then the neighbor with the value 4 with the higher rowSum is added.

If all of the neighbors of the elements are already selected, the unselected element with the highest rowSum is selected ST62, it's neighbors are identified ST64, and subsequent steps may be repeated until all of the unselected elements are selected and grouped. This process of forming a group as outlined in FIG. 11 is performed until all the elements form a part of a group.

In alternate embodiments, additional parameters such as minGroupSize may be defined and utilized by the greedy algorithm to ensure a minimum number of elements in each group.

Determining Causes of Novel Input

After an HTM has learned the patterns and sequences of input patterns, the HTM may determine causes of novel input using what may be referred to as "inference." In general, presented with novel sensed input data, an HTM may infer which of its learned causes is/are the source of the novel sensed input data based on statistical comparisons of learned groups and patterns with patterns in the novel sensed input data.

In one or more embodiments, a cause is determined based on a single sensed input. An HTM node receives the newly sensed input, the HTM node assigns probabilities as to the likelihood that the new sensed input matches each of its learned sensed input groups. Then, as described above, the distribution over the set of groups learned by the HTM node is passed to a higher level node.

The distribution passed by an HTM node is derived from a "belief" as to the likelihood that each learned cause is the cause of sensed input patterns at the input of the HTM node. A "belief" also includes those messages that are derived from or based on the belief For example, an HTM node having learned five causes may deterministically assign scores that represent the probability that each of the five learned causes is the cause of sensed input. In one embodiment, the inputs are not exclusively associated with a single cause. Therefore, in some instances one or more scores indicating the probability that learned causes are the cause of the sensed input could equal 1 or a corresponding score which indicates a high likelihood that the learned cause is the cause of the sensed inputs. These scores (or "beliefs" as described above) may be normalized (e.g., distribution $P(e^-_t|y)$) or un-normalized (e.g., belief vector $B(e^-_t|y)$) and are passed to a parent node.

The parent node may then determine temporal adjacencies among the distributions sent from its child nodes, and then, based on its learned sensed input patterns and groups thereof, pass to a yet higher level node its own belief as to the likelihood that each of its learned causes is the cause of sensed groups at its input. In other words, a parent node forms its own "higher level" belief as to the cause of the sensed input patterns at least partly based on some statistical convergence of the beliefs passed from its child nodes.

Further, in one or more embodiments of the present invention, one or more prior probabilities may be set manually in addition to or instead of having prior probabilities set via prediction. In other words, an HTM may be manually controlled to anticipate a particular cause or set of causes.

Feedback in Group Based Temporal Pooling

During the learning phase, inter-node feedback signals may be sent from a parent node to children nodes. The inter-node feedback signals are generated from a parent node and then propagated to all or a subset of the children nodes associated with the parent node. The inter-node feedback signals may be used by the children nodes for grouping the co-occurrences. By using such inter-node feedback signals, the HTM network may learn groups of co-occurrences that better reflect temporal continuity, and therefore create better generalization.

Referring to FIG. 2, the children nodes 22 to 28 (at level L1) receive input patterns and send forward signals to their parent nodes 30 and 32 (at level L2). The parent nodes 30 and 32 in return send inter-node feedback signals to the children nodes 22 to 28. The inter-node feedback signals may serve various functions including the functions as described below in detail with reference to FIG. 12A to FIG. 17. Likewise, the nodes 30 and 32 (at level L2) send forward signals to their parent node 34 (at level L3), and the node 34 in return sends inter-node feedback signals to nodes 30 and 32. In the following description, the inter-node feedback signals will be described with respect to nodes 22, 24, and 30 for the sake of brevity and explanation. The node 30 is herein referred to as the "parent node" and the nodes 22 to 24 are herein referred to as "children nodes" or a "child node." The parent node and child node are relative concepts; and thus, the same nodes may become parent nodes or children nodes depending on the perspective from which the nodes are viewed.

Referring to FIG. 3, the forward signal 41 is generated by the co-occurrence detector 42, and fed to the node 30. In one or more embodiments, the group learner 44 does not output the belief vector $B(e^-_t|G)$ or the distribution $P(e^-_t|G)$ until the node 24 finishes learning. Therefore, the co-occurrence detector 42 generates and sends the forward signal 41 to the group learner 44 during the learning phase. In other embodiments, the group learner 44 outputs the belief vector $B(e^-_t|G)$ or the distribution $P(e^-_t|G)$ based on the learning accumulated up to a certain time during the learning phase. In such embodiments, the belief vector $B(e^-_t|G)$ or the distribution $P(e^-_t|G)$ may be used as the forward signal of the node 24.

FIGS. 12A-12D are diagrams illustrating updating of the time-adjacency matrix with different increments, according to one embodiment. The inter-node feedback signals from the parent node 30 to the nodes 22, 24 may be used to adjust the increments for the time-adjacency matrix. After the parent node 30 detects changes in the forward signals from child node 22 (or 24), the parent node 30 may send an inter-node feedback signal to the other child node 24 (or 22). After receiving the inter-node feedback signal, the child node 24 (or 22) may change the increments of the counts (D1 to D4) in its time-adjacency matrix (contrast this with the embodiments of FIG. 6A to 6D where a fixed increment of +1 was used in each update). Specifically, when the child node 24 (or 22) receives an inter-node feedback signal from the parent node 30 indicating changes in the forward signal from the sibling node 22 (or 24), the child node 24 (or 22) increases the increments of the counts because the subsequent input patterns to the child node 24 (or 22) are likely to be a result of changes in the input patterns at child node 22 (or 24), not due to noises or aberrations at the child node 24 (or 22). By increasing the increments of the time-adjacency matrix, the child node 24 (or 22) can generate the time-adjacency table that is more reflective of true changes in the input patterns.

In one or more embodiments, the increments for the time-adjacency matrix at a child node may be adjusted depending on the amount of changes in the forward signal from its sibling node. For example, if only one variable in the forward signal from the sibling node changes (e.g., change from $\{0, 0, 1, 0\}$ to $\{0, 0, 0, 0\}$), the increments in the time-adjacency matrix at the child node may be small (e.g., increment=+1). But if more than two variables change in the forward signal from the sibling node (e.g., change from $\{0, 0, 1, 0\}$ to $\{1, 0, 0, 1\}$), the increments in the time-adjacency matrix at the child node may be increased (e.g., increment=+5).

In one or more embodiments, two runs of the same input patterns are executed in series. In the first run, the parent node remains in a passive mode where the parent node monitors forward signals generated by the children nodes generated in response to the set of the input patterns. The inter-node feedback signal corresponding to the monitored input patterns are generated and stored at the parent node. The inter-node feedback signals, however, are not provided to the children node in the first run. In the second run, the parent provides the inter-node feedback signal to the children nodes concurrently with or before the children nodes receives input signal that caused changes in the forward signal from the child nodes. In this way, the lag time for providing the inter-node feedback signal from the parent node to the children nodes can be eliminated or reduced in the second run. Also, more accurate grouping of the co-occurrences may be performed in the second run because the inter-node feedback signal for an input pattern is always available for the child node when it is time for the child node to group the input patterns.

Figure 13:
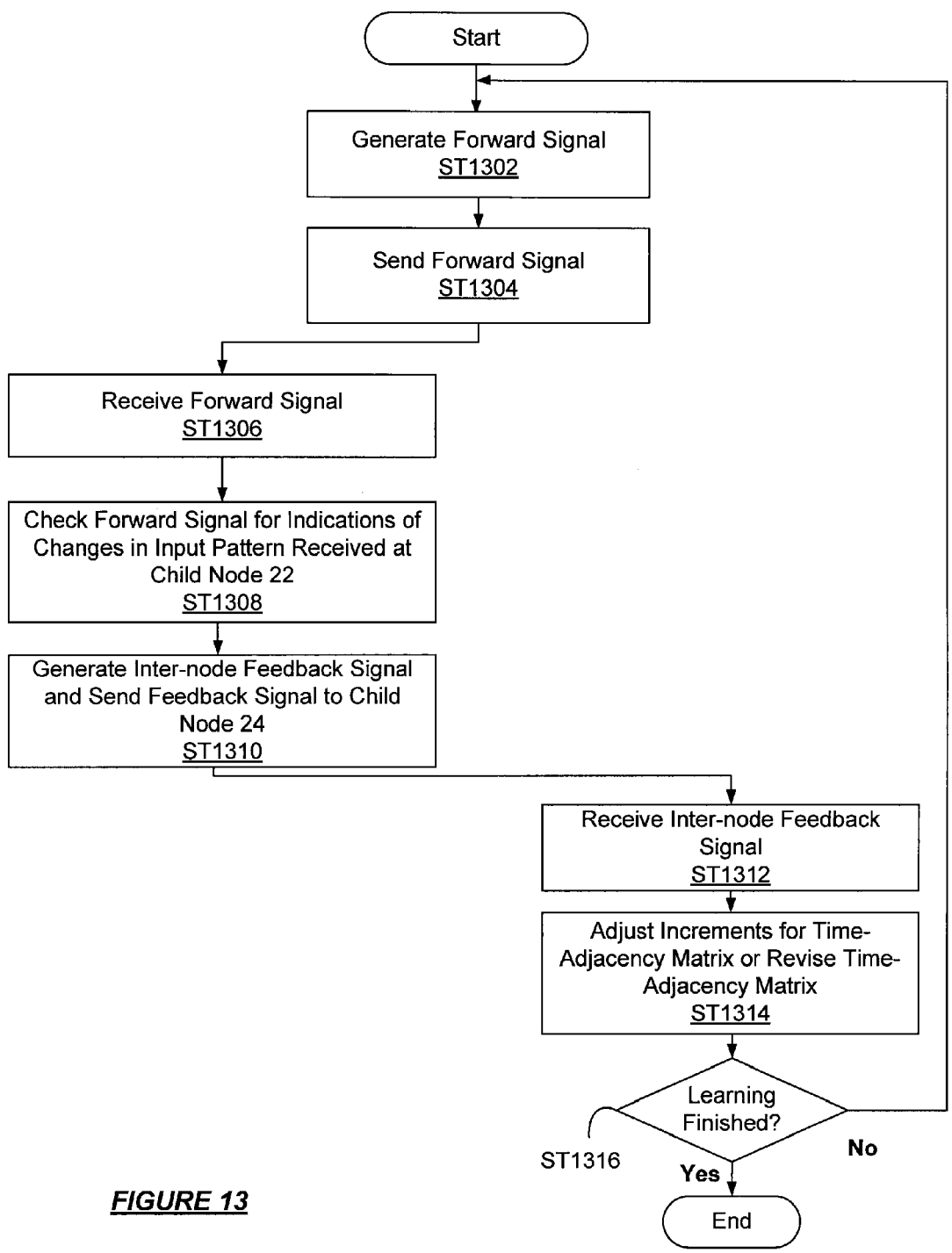
FIG. 13 is a flowchart illustrating a method of adjusting the time-adjacency matrix, according to one embodiment.

FIG. 13 is a flowchart illustrating a method of adjusting the time-adjacency matrix, according to one embodiment. First, a child node (e.g., node 22) generates ST1302 the forward signal based on the input patterns received at the child node (e.g., node 22). The forward signal may be generated by the co-occurrence detector 42 or it may be generated by the group learner 44 in the form of the distribution $P(e^-_t|y)$) or the belief vector $B(e^-_t|y)$). The forward signal is then sent ST1304 from a child node (e.g., node 22) to its parent node (e.g., node 30).

After receiving ST1306 the forward signal, the parent node (e.g., node 30) checks ST1308 the forward signal for indication of changes in the input patterns at the child node (e.g., node 22). The parent node 30 then generates ST1310 the inter-node feedback signal and sends ST1310 the inter-node feedback signal to the sibling nodes (e.g., node 24) of the child node (e.g., node 22). In one embodiment, the inter-node feedback signal is propagated to all the sibling nodes. In another embodiment, the inter-node feedback signal is sent to only a subset of the sibling nodes (e.g., children nodes with slower processing speed).

The sibling node (e.g. node 24) receives ST1312 the inter-node feedback signal. Then the sibling node (e.g., node 24) adjusts ST1314 the increments for the time-adjacency matrix or revises its time-adjacency matrix, as described above.

In one embodiment, the inter-node feedback signal from the parent node is used for correcting the grouping of the co-occurrences at the children nodes. The parent node receives the forward signals from multiple children nodes. Therefore, the parent node may collect and analyze the forward signals from the multiple children nodes to detect problems in classification of the co-occurrences at the children nodes. After detecting the problems, the parent node may provide inter-node feedback signals to the children nodes to rectify the problems. In another embodiment, the parent node relays the forward signals from the children nodes to its sibling nodes so that the sibling nodes can detect and rectify the problems in their grouping of the co-occurrences.

FIG. 14A is a table illustrating an example of the co-occurrences correctly grouped at all of the children nodes N1 to N4. The children nodes N1 to N4 provide the forward signals to a parent node indicating the grouping of the co-occurrences. In the example of FIG. 14A, a set of co-occurrences 1 is grouped and classified as group G11 at child node N1, the same co-occurrences are grouped as group G21 at child node N2, as group G38 at child node N3, and as group G46 at child node N4. Similarly, a set of co-occurrences 2 is grouped and classified as group G14 at a child node N1, as a group G22 at child node N2, as a group G33 at a child node N3, and as a group G44 at child node N4. In this example, the children nodes N1 to N4 are coupled to the same type of sensory nodes, and the same set of sensory input patterns from the sensory nodes will be grouped and classified into a group across all of the children nodes N1 to N4. For example, the groups G11, G21, G38, and G46 may all include the same group of co-occurrences {a, b, c, d, e, f}.

FIG. 14B is a table illustrating an example where the child node N1 incorrectly groups the same set of co-occurrences 1 of FIG. 14A into two separate groups GA and GB. This is the case of under-grouping of the co-occurrences at the child node N1. The misclassification of the groups may be due to various reasons including, among others, non-optimal threshold for identifying the co-occurrences, and noises in the sensed input patterns. The co-occurrences are correctly grouped at the children nodes N2 to N4, the forward signals from the children nodes N2-N4 would indicate that the co-occurrences 1A ({a, b, c}) and the co-occurrences 1B ({d, e, f}) are classified to the same group (group G21, G38, G46) whereas a forward signal from the child node N1 would indicate different grouping for the co-occurrences 1A ({a, b, c}) and the co-occurrences 1B ({d, e, f}). Absent the inter-node feedback signal from the parent node, the child node N1 does not have any information about grouping of the co-occurrences at its sibling nodes N2-N4; and, thus the child node N1 has no information to recognize and correct the grouping of the co-occurrences.

The parent node monitors the forward signals from the children nodes N1 to N4, and detects any indication of misclassification at the children nodes N1 to N4. Then the parent node sends the inter-node feedback signal to the children nodes that likely made incorrect grouping of the co-occurrences. After the child node receives such inter-node feedback signal, the child node may revise the grouping or flag the group so that the input patterns classified to that group are scrutinized. For example, if the parent node receives the forward signals from the children nodes N2-N4 indicating the same group for the co-occurrences {a, b, c, d, e, f} but the forward signal from the child node N1 indicates two separate groups for the same co-occurrences, the parent node may send an inter-node feedback signal to the child node N1 requesting the child node N1 to take corrective actions so that similar grouping of the co-occurrences are achieved at the child node N1.

In one embodiment, the corrective actions at the child node comprise changing the threshold for classifying the input patterns into different co-occurrences. As described above, a representative input pattern may be used as a co-occurrence and other input patterns similar to the representative input pattern may be classified to the same co-occurrence to reduce the number of co-occurrences for processing at the node. In one embodiment, Euclidean distances or hamming distances are used as thresholds to determine if the input patterns be classified to already created co-occurrences or create a new co-occurrence for that input patterns. In one embodiment, the feedback from the parent node changes the thresholds for creating the new co-occurrences. In another embodiment, the inter-node feedback signal changes the increments of the time-adjacency table based on the inter-node feedback signal, as described above in detail with reference to FIGS. 12A to 12D.

Figure 15:
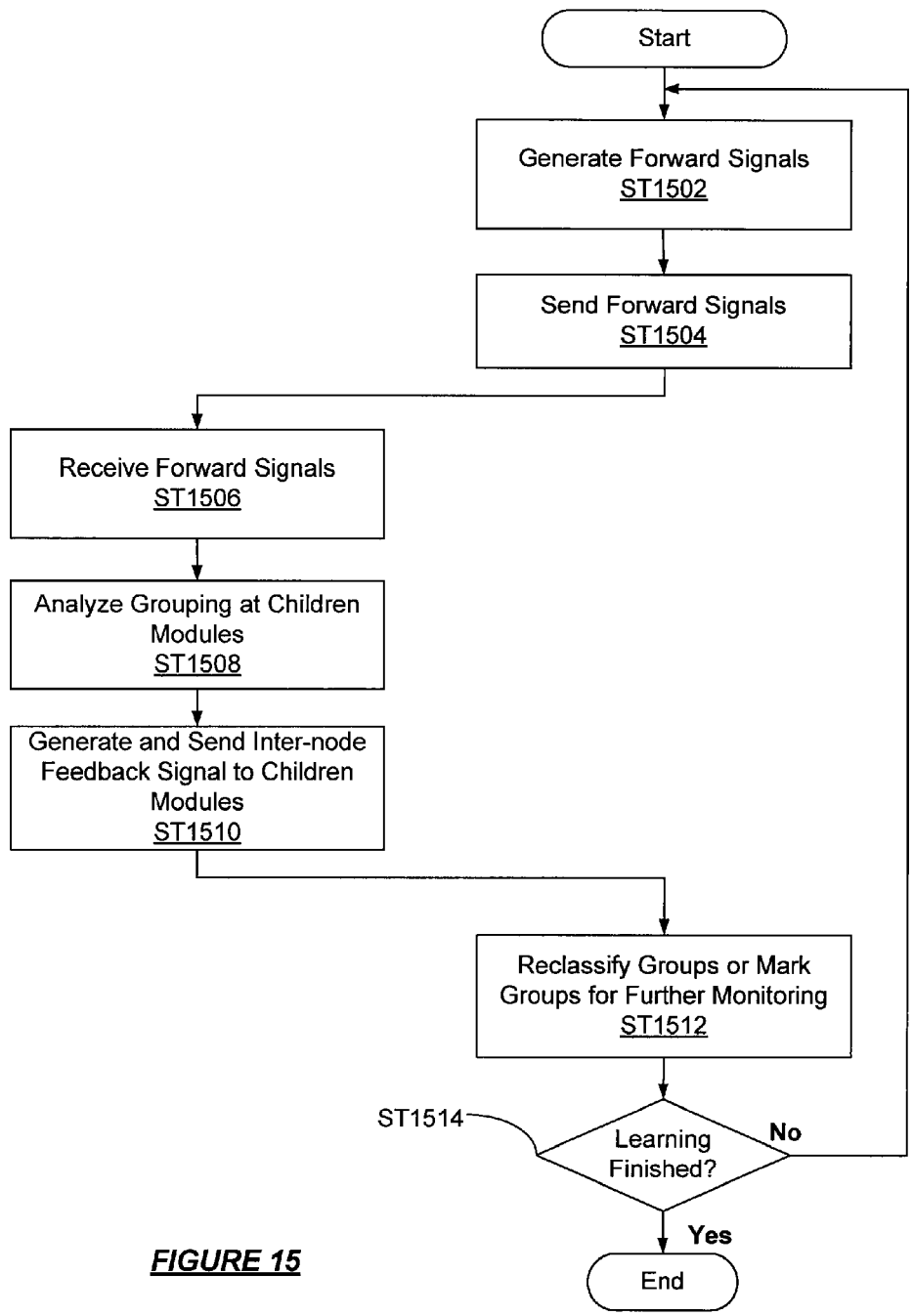
FIG. 15 is a flowchart illustrating a method of sending a feedback signal from a parent node to a child node to correct grouping of co-occurrences, according to one embodiment.

FIG. 15 is a flowchart illustrating a method of generating and sending an inter-node feedback signal from a parent node to children nodes to correct grouping of co-occurrences at the children nodes, according to one embodiment. First, the forward signals are generated ST1502 at the children nodes N2-N4 and sent ST1504 to the parent node. The parent node receives ST1506 the forward signals. Then the forward signals are analyzed at the parent node to determine whether grouping of the co-occurrences at the children nodes N1-N4 are incorrect. Then the parent node generates and sends ST1510 inter-node feedback signals to some or all of the children nodes based on the forward signals from the children nodes N1-N4. The children nodes N1-N4 receive the inter-node feedback signals and reclassify the groups according to the inter-node feedback signal or further monitor the input patterns at the children node N1-N4 to rectify or correct the grouping of the co-occurrences.

In one embodiment, the inter-node feedback signal is used for rectifying the over-grouping of the co-occurrences. The over-grouping of the co-occurrences refers to the misclassification of the co-occurrences where a group includes more co-occurrences than the optimal grouping. Referring to FIG. 14A, for example, the co-occurrences 1 of the group G11 and the co-occurrences 2 of the group G14 may be grouped into a single group. The over-grouping of the co-occurrences may be detected at the parent node using a method similar to the process described above in detail with reference to FIGS. 14A and 14B. Then the inter-node feedback signals may be provided by the parent node to the children nodes N1-N4 to take corrective actions to rectify the over-grouping of the co-occurrences.

In one embodiment, the parent node merely relays the forward signals to the children nodes in the form of inter-node feedback signals instead of analyzing the forward signals for misclassification of the co-occurrences. That is, the parent node does not determine candidates for misclassification or monitor the forward signals for other problems. The parent node merely relays the forward signals from sibling nodes to the child node. The child node is responsible for analyzing the inter-node feedback signals to detect and correct any problems in its grouping of the co-occurrences. Alternatively, the parent node may relay the forward signals from the children nodes to a tool for detecting and debugging the errors in the children nodes. The tool may then provide signals for debugging to the parent node which may be propagated to the children nodes, or the tool may directly provide the signals for debugging to the children nodes.

In one embodiment, an intra-node feedback loop may be used within a node to refine, revise or modify the co-occurrences detected at the node. Referring to FIG. 3, the group learner 44 provides the intra-node feedback signal 48 to the co-occurrence detector 42. Generally, in the learning phase, the co-occurrence detector 42 identifies the co-occurrences and their counts for the group learner 44. In the inference phase, the co-occurrence detector 42 generates the distribution $P(e^-_t|y)$ representing the probability that the input patterns correspond to the co-occurrences and provides the distribution $P(e^-_t|y)$ to the group learner 44 for processing. Therefore, the general direction of information flow is from the co-occurrence detector 42 to the group learner 44. In embodiments of FIG. 3, the information in the reverse direction (from the group learner 44 to the co-occurrence detector 42) is provided as the intra-node feedback signal 48.

In one embodiment, the intra-node feedback signal 48 is provided to the co-occurrence detector 42 to merge the co-occurrences detected at the co-occurrence detector 42. The number of co-occurrences that may be detected and processed at the node 24 is limited due to limited computation and storage resources available to the HTM 20. An excessive number of co-occurrences may cause delays in the output from the node, and increase the required computation and storage resources. One way of reducing the number of co-occurrences identified at the co-occurrence detector 42 is increasing the threshold for creating new co-occurrences. By increasing the threshold, the co-occurrence detector 42 classifies an input pattern into an already created co-occurrence that would otherwise create a new co-occurrence. But increasing the threshold for all the co-occurrences may degrade the performance of the node by generating overly inclusive co-occurrences.

An alternative way of reducing the number of co-occurrences is to selectively merge two or more co-occurrences. The co-occurrences to be merged may be selected using criteria that reduce the number of co-occurrences while minimizing the degrading of the performance of the node. Such criteria include, among others, that the distance or difference between the co-occurrences to be merged be small.

Figure 16:
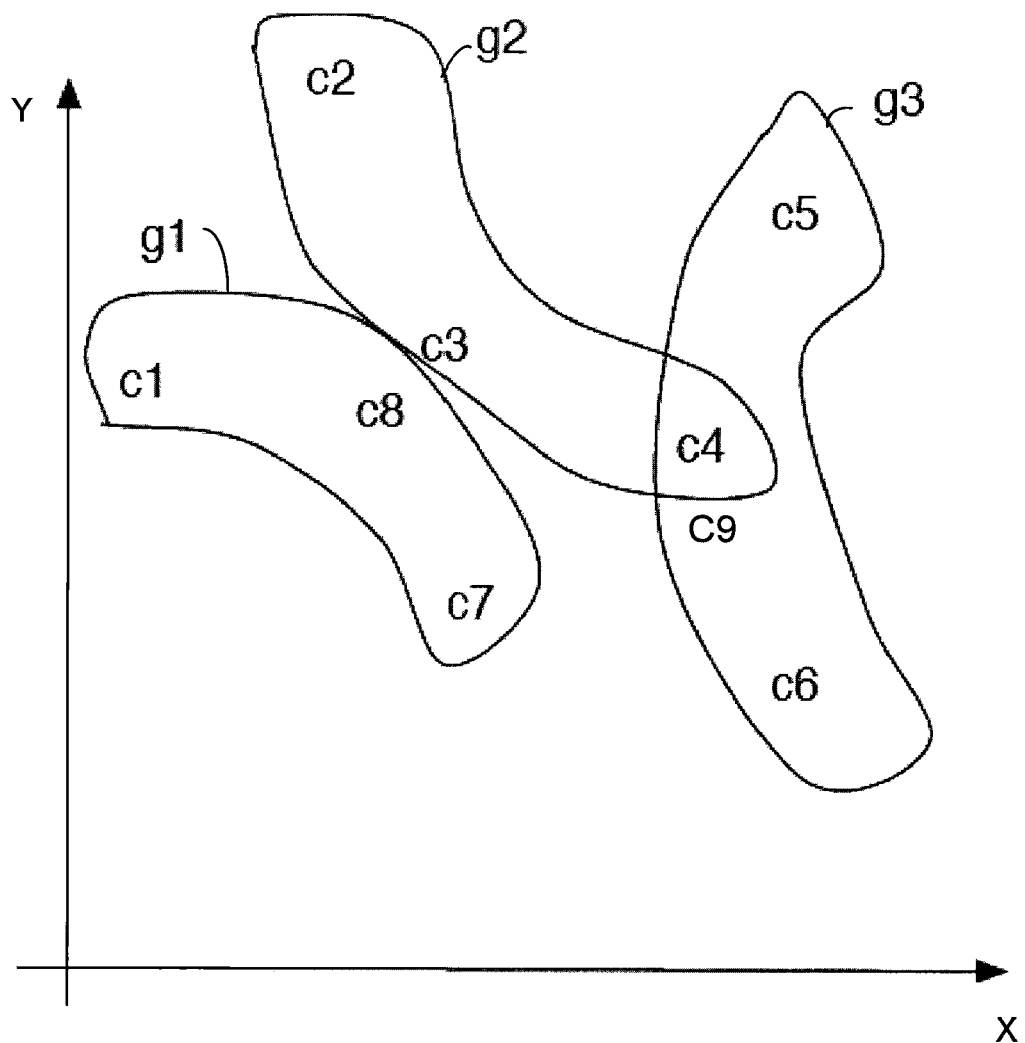
FIG. 16 is a graph illustrating grouping of co-occurrences for merging, according to one embodiment.

Specifically, the co-occurrences closely resembling each other (e.g., shorter distances between the co-occurrences) are selected because they are more likely to represent the same cause. The closeness between the co-occurrences may be determined by Euclidean distance or hamming distance of the co-occurrences. In one embodiment, co-occurrences are merged if the distance between the co-occurrences is below a predetermined threshold. The threshold may be adjusted to control the number of the final co-occurrences to be left for processing at the node. Referring to FIG. 16, the co-occurrences c3 and c8 are most closely located. Therefore, these two co-occurrences c3 and c8 are the first co-occurrences to be merged into one co-occurrence.

In one or more embodiments, after determining the co-occurrences to be merged at a child node, the information of the merged co-occurrences is propagated to the nodes (grandchildren nodes) at the lower levels of the HTM. The grandchildren nodes may then merge the groups corresponding to the co-occurrences merged at the child node. The co-occurrence detectors of the grandchildren nodes may then propagate the information of the changes in the co-occurrences to great-grandchildren nodes. The process at the great-grandchildren nodes may be repeated in the same manner to merge groups and co-occurrences at the great-grandchildren nodes. The merging of groups and co-occurrences may be repeated until the nodes at the lowest level of the HTM are merged.

Figure 17:
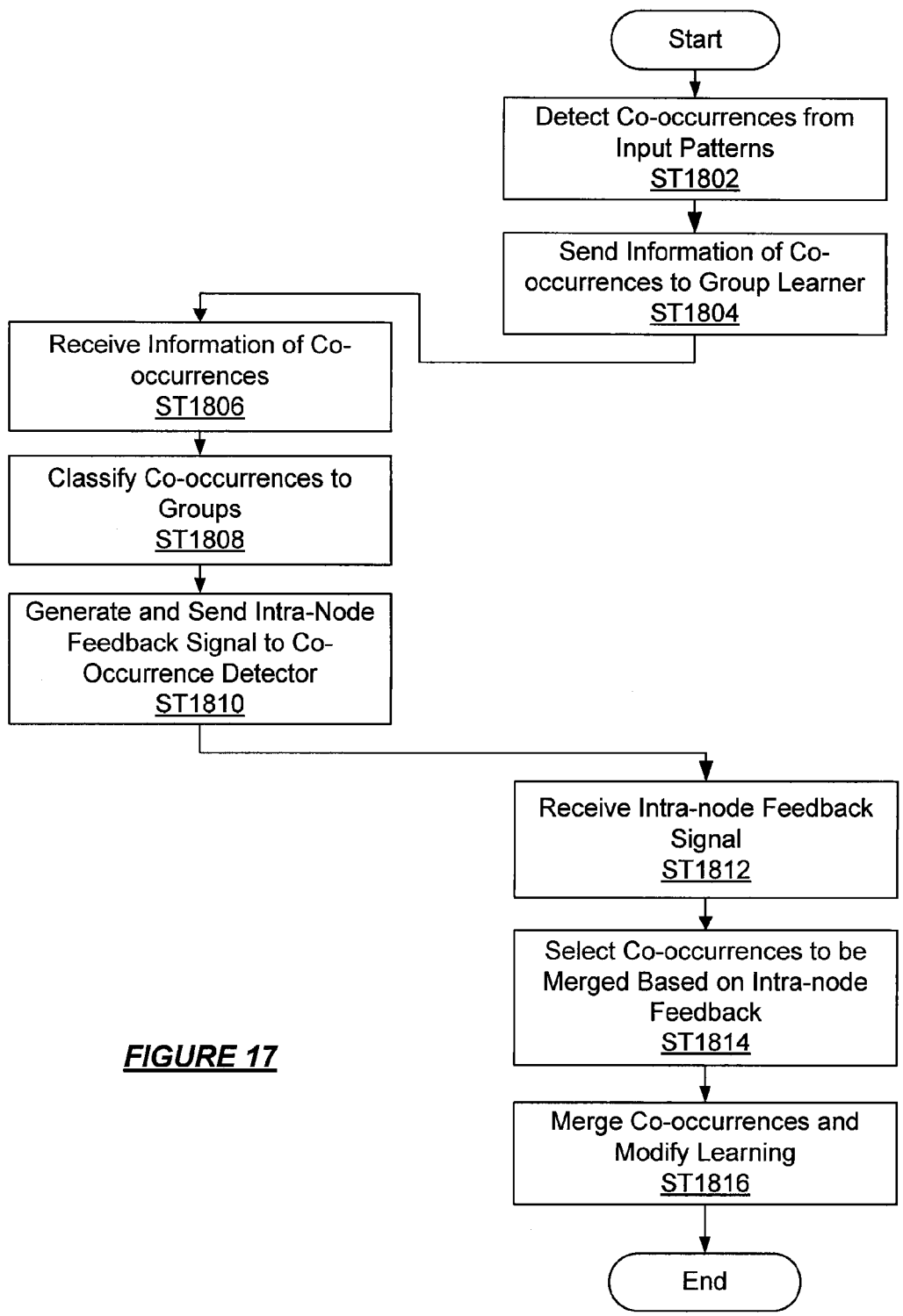
FIG. 17 is a flowchart illustrating a method of merging the co-occurrences, according to one embodiment.

FIG. 17 is a flowchart illustrating a method of merging co-occurrences, according to one embodiment. First, the co-occurrences are detected ST1802 from the input patterns. The information of the co-occurrences is then sent ST1804 from the co-occurrence detector to the group learner. The group learner receives ST1806 the information of the co-occurrences from the co-occurrence detector, and groups ST1808 the co-occurrences. After the grouping of the co-occurrences is finished, the group learner generates and sends ST1810 the intra-node feedback signal to the co-occurrence detector. The co-occurrence detector receives ST1812 the intra-node feedback signal, and selects ST1814 the co-occurrences to be merged based on the intra-node feedback. Then the selected co-occurrences are merged ST1816, and the learning of the co-occurrences at the co-occurrence detector is modified accordingly.

The intra-node feedback signal may also be used to determine which co-occurrences should be split into two or more co-occurrences. In order to improve the performance of a node, a co-occurrence may be split into multiple co-occurrences. By splitting the co-occurrences, a more refined grouping of input patterns may be accomplished. This may result in more accurate inference or prediction of the HTM. The co-occurrences to be split, however, must be selected carefully so that increase in the performance of the node is commensurate with the additional processing capacity and storage capacity required for adding the co-occurrences.

Figure 18A:
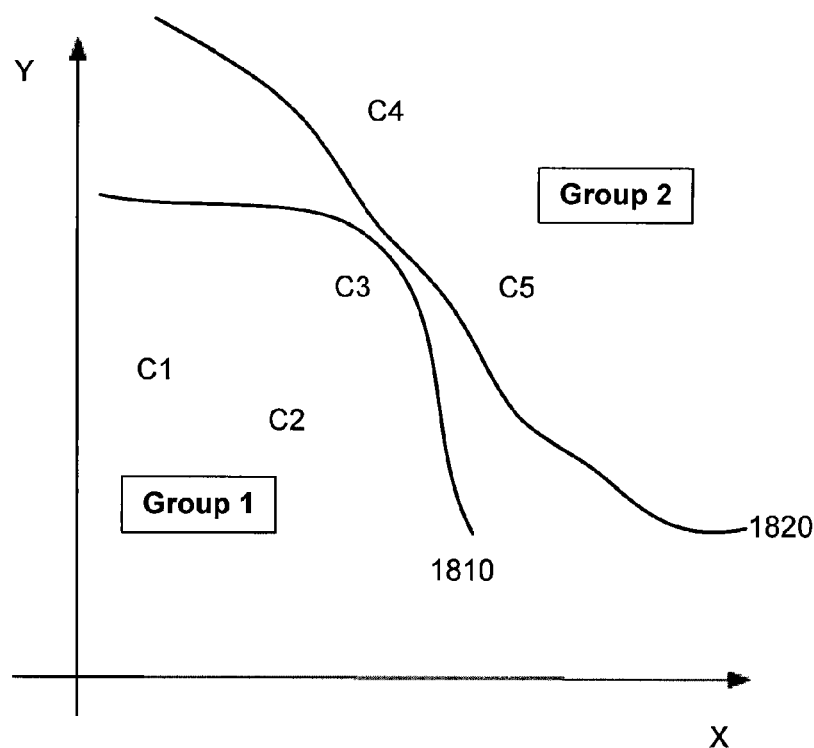
FIG. 18A is a graph illustrating co-occurrences classified into two groups, according to one embodiment.

In one embodiment, the co-occurrences near the boundary of the groups are selected for splitting. The intra-node feedback signals indicating the grouping of the co-occurrences are provided to the co-occurrence detector 42 to determine the co-occurrences close to the boundary of the group including the co-occurrences. FIG. 18A is a graph illustrating grouping of the co-occurrences at a node. In the example of FIG. 18A, the co-occurrences are grouped into two groups, group 1 and group 2. Group 1 includes co-occurrences C1, C2 and C3 having a boundary 1810. Group 2 includes co-occurrences C4 and C5 having a boundary 1820. Assume that each co-occurrence C1-C5 includes two variables, one indicating an x-coordinate and the other indicating a y-coordinate of a pixel. After the group learner 44 groups the co-occurrences C1 to C5 to group 1 and group 2, the information of such grouping is sent to the co-occurrence detector 42 as the intra-node feedback signal 48.

After the co-occurrence detector 42 receives the intra-node feedback signal 48, the co-occurrence detector 42 selects one or more co-occurrences close to the boundary for splitting into multiple co-occurrences. The co-occurrences near the boundary of one group are more likely to include input patterns that should be classified into another group than the co-occurrences located further away from the boundary. Therefore, the co-occurrences near the boundary of the group are more likely to be split into different groups than the co-occurrences located further away from the boundary when the grouping of the co-occurrences becomes more refined. In the example of FIG. 18A, the co-occurrence C3 is located closer to the boundary 1810 of group 1 than the co-occurrences C1 and C2; and thus, the co-occurrences C3 is more likely to include input patterns belonging to group 2 (i.e., erroneously grouped input patterns) compared to the co-occurrences C1 and C2. Therefore, the co-occurrence C3 is selected as the first candidate for splitting.

Splitting of the co-occurrences, for example, may be accomplished by lowering the threshold distance for creating new co-occurrences for the input patterns. In one embodiment, the input patterns within a predetermined threshold distance from a co-occurrence are grouped to that co-occurrence at the co-occurrence detector. Therefore, by lowering the predetermined threshold distance, the grouping of the input patterns can be refined.

Figure 18B:
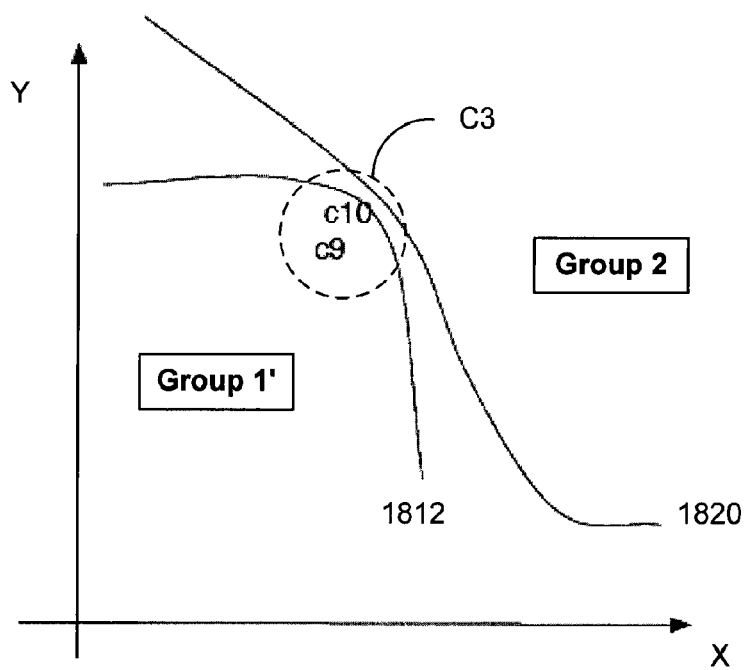
FIG. 18B is a graph illustrating two split co-occurrences classified to the same group, according to one embodiment.

FIG. 18B is a graph that illustrates boundaries of the groups after the co-occurrence C3 is split into a co-occurrence C9 and a co-occurrence C10. After the co-occurrence C3 is split into the co-occurrences C9 and C10, a new grouping is performed at the group learner 44 based on the split co-occurrences C9 and C10 (instead of using the co-occurrence C3). In the example of FIG. 18B, the new grouping based on the split co-occurrences C9 and C10 classifies are illustrated as being grouped to the same group 1'. The group 1' has a boundary 1812.

In one embodiment, the co-occurrence C10 closer to the boundary 1812 of the group 1' is retained whereas the co-occurrence C9 further away from the boundary 1812 is discarded by merging the input patterns of the co-occurrence C9 into the co-occurrence C10. That is, the input patterns for C9 are all reclassified to the co-occurrence C10. The co-occurrence C9 is merged to the co-occurrence C10 because the co-occurrence C9 takes up computation and storage resources of the node without contributing much to the increased performance of the node.

Figure 18C:
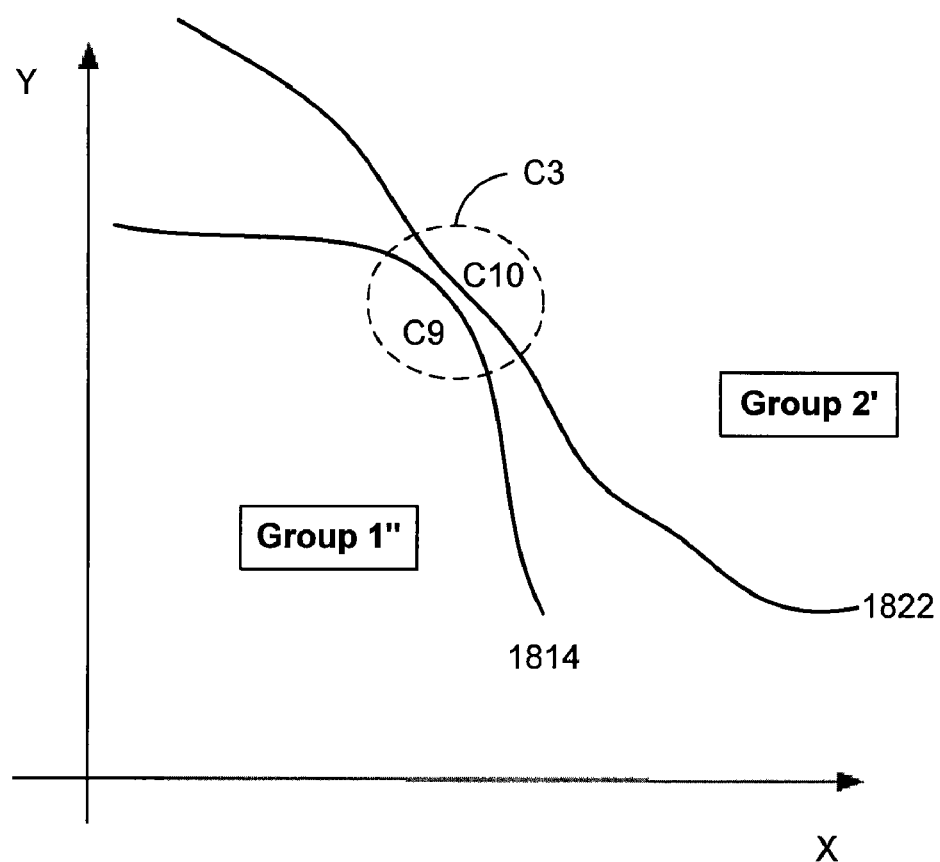

FIG. 18C is a graph illustrating the split co-occurrences C9 and C10 grouped to different groups, according to one embodiment. After the co-occurrence C3 is split into the co-occurrences C9 and C10, new grouping is performed at the group learner 44 of the node based on the split co-occurrences C9 and C10 (instead of the co-occurrence C3). In the example of FIG. 18C, the co-occurrence C9 is grouped into a group 1" and the co-occurrence C10 is grouped to group 2'. The group 1" has a boundary 1814 and the group 2' has a boundary 1822. In the example of FIG. 18C, the co-occurrence C3 was overly inclusive, including the input patterns that should have been classified to the other group (group 2'). By splitting the co-occurrences, the overly inclusive co-occurrence is now split and grouped into different groups. Both co-occurrences C9 and C10 may be retained because both co-occurrences C9 and C10 serve to increase the resolution of the group boundaries 1814, 1822, and thereby increase the performance of the node.

In one embodiment, the routine is repeated to (1) select the co-occurrences to be split, (2) regroup based on the split co-occurrences, and (3) then discard, retain or merge the split co-occurrences. The routine may be repeated to increase the resolution of the boundaries of the groups without adding much computation or storage resources needed for processing.

Figure 19A:
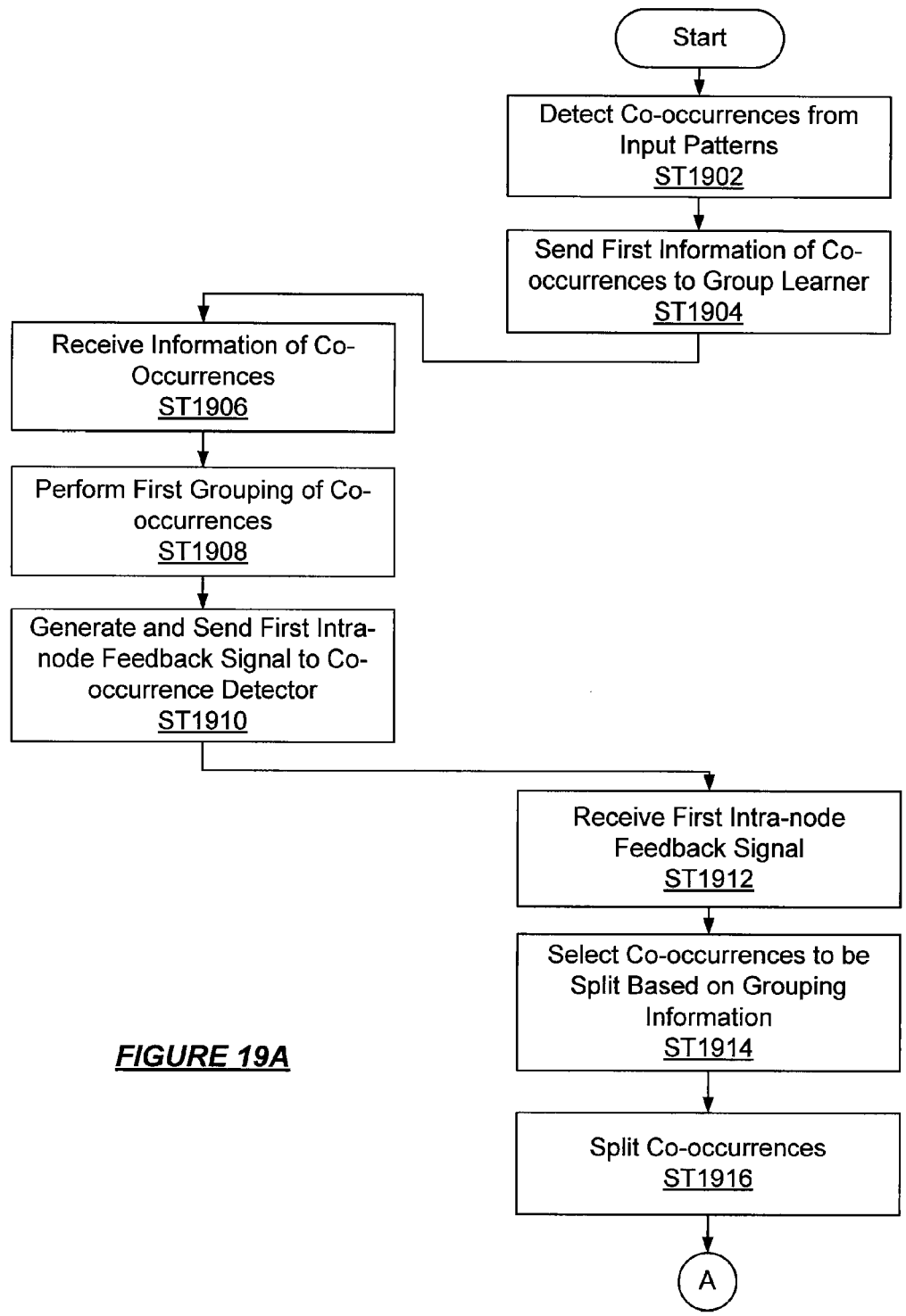
FIGS. 19A and 19B are flowcharts illustrating a method for splitting the co-occurrence, according to one embodiment.
Figure 19B:
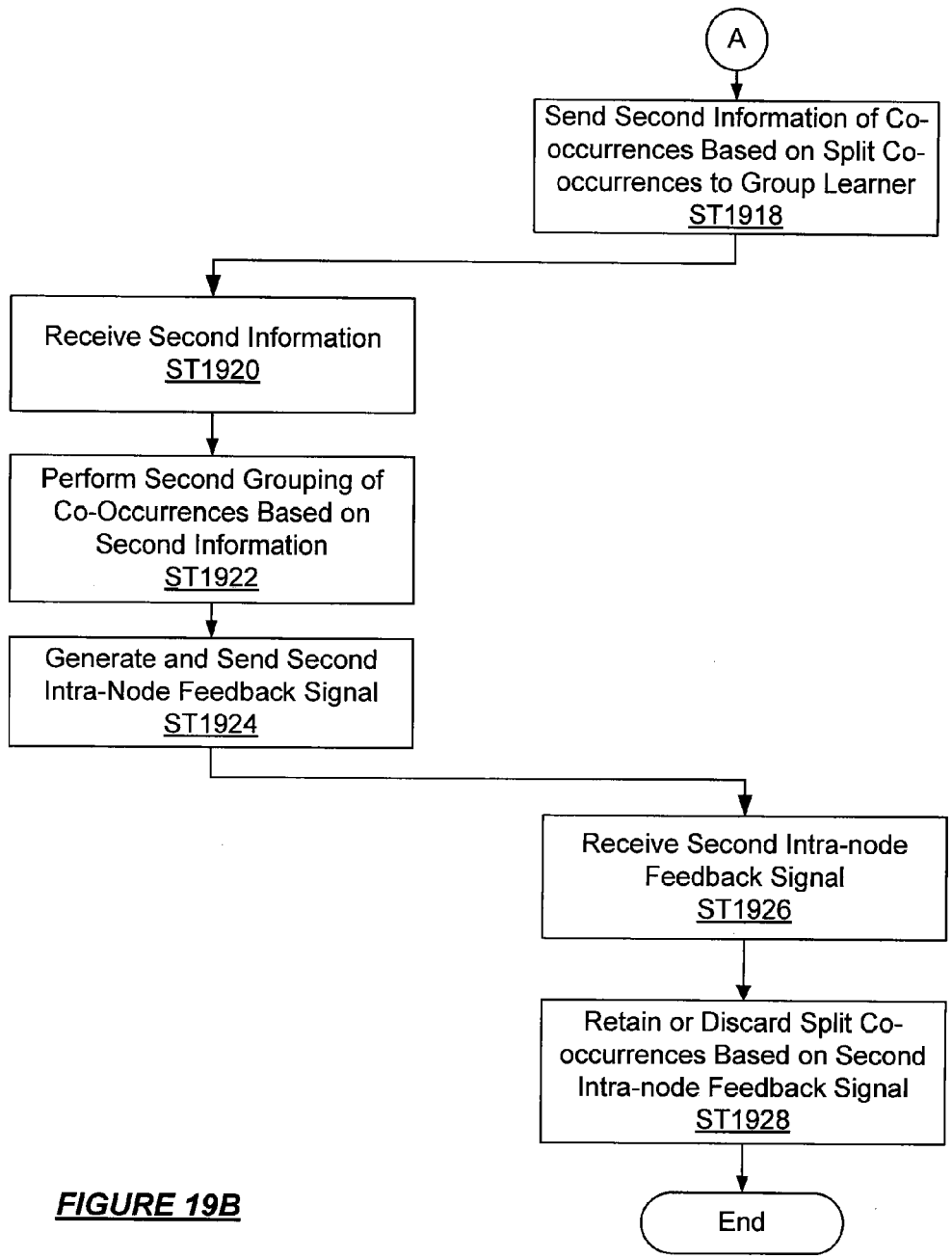

FIGS. 19A and 19B are flowcharts illustrating a method of using intra-node feedback signals to split co-occurrences at a node, according to one embodiment. Steps ST1902 to ST1910 are essentially the same as the steps for merging the co-occurrences using the intra-node feedback signal, as described above with reference to FIG. 17. That is, the co-occurrences are first detected ST1902 from the input patterns. The first information of the co-occurrences (based on the co-occurrences not split) is then sent ST1904 from the co-occurrence detector to the group learner. The group learner receives ST1906 the first information of the co-occurrences (based on the co-occurrences not split) from the co-occurrence detector and performs first grouping ST1908 of the co-occurrences. After the grouping of the co-occurrences is finished, the group learner generates and sends ST1910 a first intra-node feedback signal to the co-occurrence detector.

The co-occurrence detector receives ST1912 the first intra-node feedback signal, and selects ST1914 the co-occurrences to be split based on the inter-node feedback. The selected co-occurrences are split ST1916. In one embodiment, the co-occurrences are split by lowering the threshold distance for creating new co-occurrences. The co-occurrence detector then sends ST1918 second information to the group learner including the information of co-occurrences based on the split co-occurrences.

The group learner then receives ST1920 the second information of the co-occurrences. The group learner then performs ST1922 second grouping of the co-occurrences based on the second information indicating the split co-occurrences. The group learner generates and sends ST1924 a second intra-node feedback signal. The co-occurrence detector receives ST1926 the second intra-node feedback signal. Then the co-occurrence detector retains or discards ST1928 the split co-occurrences based on the second intra-node feedback signal. Specifically, if the split co-occurrences belong to the same group, then the split co-occurrence closer to the boundary of the group is retained but the other split co-occurrences further from the boundary are discarded. Conversely, if each of the split co-occurrence is classified into different groups, then all of the split co-occurrences are retained.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. An Hierarchical Temporal Memory (HTM) network comprising:

first nodes for receiving a training input data representing an object or a status of an object in a learning phase, the first nodes in the learning phase grouping patterns and sequences in the training input data and in an inference phase subsequent to the learning phase receiving sample input data generating first vectors representing information about patterns and sequences in the sample input data corresponding to the patterns and sequences grouped in the learning phase; and a second node associated with the first nodes for receiving output signals from the first nodes for generating and outputting a second vector based on the first vectors in the inference phase, the second vector representing information about causes of the sample input data, the second node providing inter-node feedback signals to the first nodes for grouping of the training input data at the first nodes.

2. The HTM network of claim 1, wherein each of the first nodes comprises:

a co-occurrence detector receiving the training input data to identify co-occurrences from the patterns and sequences in the training input data; and a group learner receiving information on the co-occurrences from the co-occurrence detector, the group learner grouping the co-occurrences based on temporal relationship between the co-occurrences.

3. The HTM network of claim 2, wherein the group learner comprises a time-adjacency table for tracking temporal relationships between the co-occurrences by scoring temporal adjacency between the co-occurrences, increments for scoring the temporal adjacency adjusted by the inter-node feedback signal.

4. The HTM network of claim 2, wherein the group learner modifies the grouping of the occurrences at the group learner based on the inter-node feedback signal.

5. The HTM network of claim 2, wherein the group learner generates and provides an intra-node feedback signal to the co-occurrence detector, the intra-node feedback signal including information for merging multiple co-occurrences into one co-occurrence or splitting a single co-occurrence into multiple co-occurrences at the co-occurrence detector.

6. The HTM network of claim 1, wherein the inter-node feedback signal includes information identifying grouping of patterns and sequences in at least one first node.

7. A node in a Hierarchical Temporal Memory (HTM) network, the node comprising:
   a co-occurrence detector for identifying co-occurrences in patterns and sequences of training input data representing an object or a status of an object in a learning phase, the co-occurrence detector in an inference phase subsequent to the learning phase outputting information representing probabilities that patterns and sequences in sample input data correspond to the co-occurrences identified in the learning phase; and
   a group learner for receiving and grouping the co-occurrences identified by the co-occurrence detector into groups based on temporal relationships between the co-occurrences, the group learner providing to the co-occurrence detector a first intra-node feedback signal indicating grouping of the co-occurrences.

8. The node of claim 7, wherein the co-occurrence detector selects multiple co-occurrences to be merged into one co-occurrence based on the first intra-node feedback signal.

9. The node of claim 7, wherein the co-occurrence detector selects a co-occurrence to be split into multiple co-occurrences based on the first inter-node feedback signal.

10. The node of claim 9, wherein the group learner merges the co-occurrences including the multiple co-occurrences split from the selected co-occurrence, the group learner providing a second intra-node feedback signal to the co-occurrence detector for selecting co-occurrences of the multiple co-occurrence to be retained for the inference phase.

11. A computer-implemented method of determining an object or a state of an object causing an input data:
   first nodes generating first groups of first co-occurrences from patterns and sequences in training input data representing the object or the state of the object in a learning phase;
   a second node in the learning phase generating second groups of second co-occurrences responsive to receiving output signals from the first nodes;
   the second node in the learning phase generating and providing to the first nodes inter-node feedback signals for generating the first groups of the first co-occurrences at the first nodes;
   the first nodes in an inference phase subsequent to the learning phase generating first vectors representing information about patterns and sequences in sample input data corresponding to the patterns and sequences grouped to the first groups;
   the second node in the inference phase generating a second vector based on the first vectors, the second vector representing information about causes of the sample input data; and
   storing the second vector generated by the second node.

12. The method of claim 11, wherein generating first groups of first co-occurrences comprises managing time-adjacency tables at the first nodes for tracking temporal relationships between the co-occurrences by scoring temporal adjacency between the co-occurrences, increments for scoring the temporal adjacency adjusted by the inter-node feedback signals.

13. The method of claim 11, wherein generating the first groups of the first co-occurrences comprises managing time-adjacency tables at the first nodes for tracking a temporal relationship between the co-occurrences, the first groups of the first occurrences modified by the inter-node feedback signals.

14. The method of claim 11, wherein the inter-node feedback signal includes information for grouping of patterns and sequences in at least one first node.

15. A method of managing co-occurrences in a node of a Hierarchical Temporal Memory (HTM) network, comprising:
   identifying the co-occurrences in patterns and sequences of a training input data representing an object or a status of an object in a learning phase;
   grouping the co-occurrences identified by the co-occurrence detector into groups based on temporal relationships between the co-occurrences in the learning phase;
   outputting information representing probabilities that patterns and sequences in a sample input data correspond to the identified co-occurrences in an inference phase subsequent to the learning phase;
   generating a vector representing information about patterns and sequences in the sample input data corresponding to the co-occurrences of the groups in the inference phase; and
   generating a first intra-node feedback signal to the co-occurrence detector for grouping the co-occurrences in the learning phase.

16. The method of claim 15, further comprising selecting multiple co-occurrences to be merged into one co-occurrence based on the first intra-node feedback signal.

17. The method of claim 15, further comprising selecting a co-occurrence to be split into multiple co-occurrences based on the first intra-node feedback signal.

18. The method of claim 17, further comprising:
   grouping the co-occurrences including the multiple co-occurrences split from the selected co-occurrence; and
   generating a second intra-node feedback signal for selecting co-occurrences of the multiple co-occurrence to be retained for the inference phase.

* * * * *

UNITED STATES PATENT AND TRADEMARK OFFICE
CERTIFICATE OF CORRECTION

PATENT NO. : 7,983,998 B2
APPLICATION NO. : 12/053204
DATED : July 19, 2011
INVENTOR(S) : Dileep George et al.

It is certified that error appears in the above-identified patent and that said Letters Patent is hereby corrected as shown below:

Title Page item 56

Insert the following after the last line of right column of page 4:

--NAMPHOL, A., "Image Compression with a Hierarchical Neural Network," *IEEE transactions on Aerospace and Electronic Systems*, January 1996, pp. 326-338, Volume 32, No. 1.

NAPHADE, M., "A Probabilistic Framework for Semantic Video Indexing, Filtering, and Retrieval," *IEEE Transactions on Multimedia*, March 2001, pp. 141-151, Volume 3, No. 1

SPENCE, C., "Varying Complexity in Tree-Structured Image Distribution Models," *IEEE Transactions on Image Processing*, February 2006, pp. 319-330, Volume 15, No. 2.

WEISS, R. ct al., "HyPursuit: A Hierarchical Network Search Engine that Exploits Content-Link Hypertext Clustering," *Proceedings of the Seventh Annual ACM Conference on Hypertext*, March 16-20, 1996, pp. 180-193, Washington, D.C. USA.--

Signed and Sealed this
Twenty-seventh Day of September, 2011

David J. Kappos
*Director of the United States Patent and Trademark Office*